US011199828B2

(12) United States Patent
Oonishi

(10) Patent No.: US 11,199,828 B2
(45) Date of Patent: *Dec. 14, 2021

(54) VIRTUAL OBJECT DISPLAY SYSTEM

(71) Applicant: FANUC CORPORATION, Yamanashi (JP)

(72) Inventor: Nobuhito Oonishi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 274 days.

This patent is subject to a terminal disclaimer.

(21) Appl. No.: 16/425,389

(22) Filed: May 29, 2019

(65) Prior Publication Data

US 2019/0369589 A1 Dec. 5, 2019

(30) Foreign Application Priority Data

Jun. 5, 2018 (JP) .............................. JP2018-107951

(51) Int. Cl.
G05B 19/18 (2006.01)
G06T 19/00 (2011.01)
G05B 19/19 (2006.01)

(52) U.S. Cl.
CPC ......... G05B 19/182 (2013.01); G05B 19/195 (2013.01); G06T 19/006 (2013.01)

(58) Field of Classification Search
CPC .................... G05B 19/18–19; G06T 19/00
(Continued)

(56) References Cited

U.S. PATENT DOCUMENTS

2004/0183751 A1  9/2004  Dempski
2010/0063616 A1* 3/2010  Mori .................... G05B 19/406
                                                       700/160

(Continued)

FOREIGN PATENT DOCUMENTS

JP    09-212219      8/1997
JP    2000-081906    3/2000

(Continued)

OTHER PUBLICATIONS

Setti et al., "ARTool—Augmented Reality Human-Machine Interface for Machining Setup and Maintenance", Sep. 22, 2016, IntelliSys 2016: Intelligent Systems and Applications, pp. 131-155.*

(Continued)

Primary Examiner — Md Azad
(74) Attorney, Agent, or Firm — Wenderoth, Lind & Poack, L.L.P.

(57) ABSTRACT

A virtual object is displayed with a simple method. A graph generation portion generates, as the machine configuration of a control target, a graph in which constituent elements including a camera are nodes, a node selection portion selects a node on which a virtual object is desired to be displayed, a selection node notification portion notifies the node on which the virtual object is desired to be displayed to a machine configuration management device, a transformation information calculation portion calculates transformation information which includes, as a variable, a coordinate value of a control axis node on a path in the graph from a camera node to the node of a display target and which is used for calculating the position and/or the posture of the node of the display target in a coordinate system of the camera node based on the graph, a transformation information notification portion notifies the transformation information to an augmented information controller and a coordinate information transformation portion transforms the coordi- (Continued)

nate value of a control axis which is notified into the position and/or the posture of the node of the display target in the coordinate system of the camera node.

14 Claims, 24 Drawing Sheets

(58) Field of Classification Search
USPC .......................................................... 700/160
See application file for complete search history.

(56) References Cited

U.S. PATENT DOCUMENTS

| 2013/0162673 | A1* | 6/2013 | Bohn | G02B 27/0172 |
| --- | --- | --- | --- | --- |
| | | | | 345/633 |
| 2015/0302656 | A1* | 10/2015 | Miller | G06F 3/005 |
| | | | | 345/633 |
| 2017/0294050 | A1 | 10/2017 | Popescu | |
| 2018/0024525 | A1* | 1/2018 | Inoue | G05B 19/401 |
| | | | | 700/193 |

FOREIGN PATENT DOCUMENTS

| JP | 4083554 | | 2/2008 |
| --- | --- | --- | --- |
| JP | 2009-266221 | | 11/2009 |
| JP | 2012-58968 | A | 3/2012 |
| JP | 2012-248098 | A | 12/2012 |
| JP | 2013-171522 | A | 9/2013 |
| JP | 5384178 | | 1/2014 |
| JP | 2014-180707 | | 9/2014 |
| JP | 5872923 | B2 | 3/2016 |
| JP | 2016-107379 | A | 6/2016 |
| JP | 2016-162079 | A | 9/2016 |
| JP | 2017-091349 | | 5/2017 |
| JP | 2017-104944 | | 6/2017 |
| JP | 2018-008347 | | 1/2018 |

OTHER PUBLICATIONS

Zhang et ai., "Development of an AR system achieving in situ machining simulation on a 3-axis CNC machine", Jul. 21, 2009, Wiley InterScience, Computer Animation and Virtual Worlds 2010, vol. 21, pp. 103-115.*
Notification of Reasons for Refusal dated Jun. 30, 2020 in JP Patent Application No. 2018-107951.
Nee, A. Y. C.; Ong, S.-K.: Virtual and augmented reality applications in manufacturing. In: IFAC proceedings volumes, 2013, vol. 46, No. 9, S. 15-26.
Banerjee, A.; Halambi, A.; Sharda, B.: A Decision Support System for Integrating Real-time Manufacturing Control with a Virtual Environment. In: Virtual and Augmented Reality Applications in Manufacturing, edited by S.-K. Ong and A. Y. C. Nee, Springer, London, S. 83-95, 2004.
Carmigniani, J.; Furht, B.: Augmented Reality: An Overview. In: Handbook of Augmented Reality, edited by B. Furht, Springer, S. 3-46, 2011.
Office Action dated Feb. 11, 2021 in DE Patent Application No. 102018210261.9.
Daniel Wagner, Dieter Schmalstieg, "First Steps Toward Handheld Augmented Reality", Oct. 23, 2003, IEEE, ISWC '03 Proceedings of the 7th IEEE International Symposium on Wearable Computers.
Office Action dated Sep. 25, 2019 in U.S. Appl. No. 16/003,553.
Notification of Reasons for Refusal dated Jun. 18, 2019 in JP Patent Application No. 2017-127692.
Hirokazu Kato et al., "An Augmented Reality System and its Calibration based on Marker Tracking", vol. 4, No. 4 1999, with Concise Explanation.
Enylton Machado Coelho, Blair MacIntyre, Simon J. Julier, "OSGAR: A Scene Graph with Uncertain Transformations", 2004, IEEE, Proceedings of the Third IEEE and ACM International Symposium on Mixed and Augmented Reality (ISMAR 2004).
Stack Overflow, "Algorithm to exchange the roles of two randomly chosen nodes from a tree moving pointers", Feb. 16, 2016, stackoverflow.com, website, retrieved from https://stackoverflow.com/questions/35141893/algorithm-to-exchange-the-roles-of-two-randomly-chosen-nodes-from-a-tree-moving on Jul. 6, 2021.
Dirk Reiners, "Scene Graph Rendering", Mar. 5, 2002, IEEE, Proceedings of IEEE Virtual Environments (2002).
Gerhard Reitmayr, Dieter Schmalstieg, "Flexible Parametrization of Scene Graphs", 2005, IEEE, Proceedings of the IEEE Virtual Reality 2005 (VR'05), pp. 51-58.
Office Action dated Jul. 15, 2021 in U.S. Appl. No. 16/003,553.

* cited by examiner

MACHINE CONFIGURATION TREE

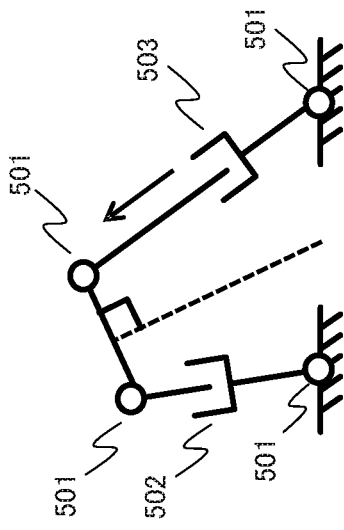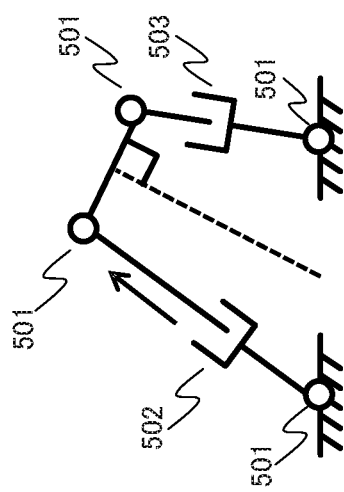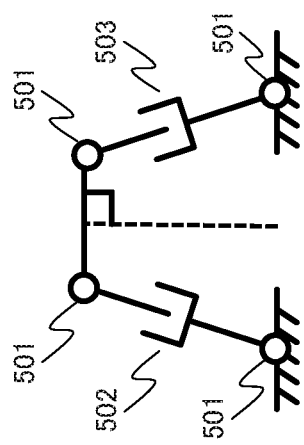
FIG. 9B

512: HOMOGENEOUS MATRIX $M_A$ REPRESENTING POSITION AND POSTURE OF CONNECTION POINT 520
513: HOMOGENEOUS MATRIX $M_B$ REPRESENTING POSITION AND POSTURE OF CONNECTION POINT 510

MACHINE CONFIGURATION

MACHINE ZERO POINT

MACHINE CONFIGURATION TREE

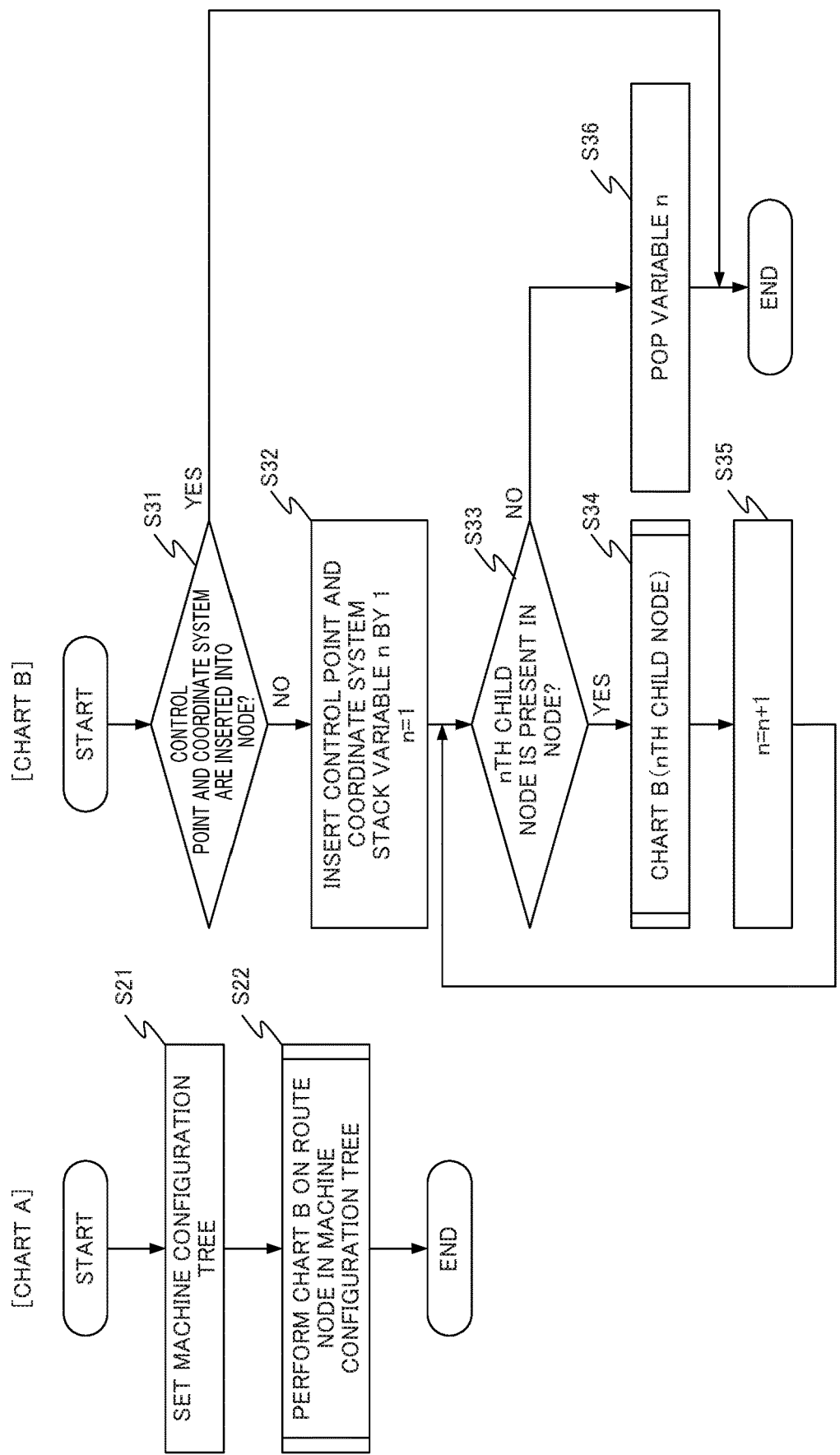

MACHINE CONFIGURATION TREE

MACHINE CONFIGURATION TREE

VIRTUAL OBJECT DISPLAY SYSTEM

This application is based on and claims the benefit of priority from Japanese Patent Application No. 2018-107951, filed on 5 Jun. 2018, the content of which is incorporated herein by reference.

BACKGROUND OF THE INVENTION

Field of the Invention

The present invention relates to a virtual object display system for performing a simulation using the technology of AR (Augmented Reality) and MR (Mixed reality).

Related Art

Conventionally, in the field of machine tools controlled by numerical controllers, workpieces and fixtures are designed by CAD (computer-aided design) or the like. The designed fixture is used, and thus a machining program for machining the workpiece is produced. Then, the machine tool is controlled by the numerical controller based on the machining program, and thus the machining of the workpiece is realized.

Here, before the fixture and the workpiece designed and the machining program are actually placed in a manufacturing line, in order to check if they are appropriate, a machining simulation is generally performed.

When this machining simulation is performed by an operation check with an actual machine, the machining simulation naturally cannot be performed until an actual fixture is completed. Hence, disadvantageously, the process is stopped until the fixture is completed.

When at the time of the operation check after the completion of the fixture, a problem such as interference is found, and thus it is necessary to change the design of the fixture, the process is further extended. A cost for changing the design of the fixture is also needed. If the design of the fixture is not changed, the machining program needs to be changed, and in this case, a cycle time necessary for the machining may be extended beyond the original cycle time.

With consideration given to these problems, there is a technology in which the operation check is not performed with the actual machine but the machining simulation is virtually performed by computation processing with a personal computer or the like. For example, in a technology disclosed in Patent Document 1, all structures in machine tools are transformed into virtual objects, and thus a machining simulation is performed.

However, in the technology disclosed in Patent Document 1, it is necessary to produce not only virtual objects for a workpiece and a fixture but also virtual objects for the entire machine of a plurality of types of individual machine tools. Moreover, in order to reproduce the operation of the actual machine tools, it is necessary to install operation processing into the virtual objects of movable parts of the machine tools. In other words, disadvantageously, it is not easy to produce the virtual objects.

Furthermore, even when the virtual objects described above are produced, if the reproducibility of the virtual objects is low, a difference from the reality is disadvantageously produced.

A technology with consideration given to the problems on virtual objects as described above is disclosed in Patent Document 2. In the technology disclosed in Patent Document 2, the interior of a machine tool is acquired with camera images, and a tool holding portion or a workpiece holding portion which is previously registered is extracted as a feature point. Then, the virtual object of the tool or the workpiece previously registered is overlaid and displayed, based on the position of feature point, on the image of the machine tool actually shot. In this way, it is not necessary to produce the virtual object of the machine tool. The information superimposed on the object actually existing in real space is hereinafter called "extended information".

Patent Document 1: Japanese Patent No. 4083554
Patent Document 2: Japanese Patent No. 5384178

SUMMARY OF THE INVENTION

However, it is necessary to fix the photographing direction of the camera to a pre-set direction, and further extraction of characteristic points becomes necessary.

Hence, an object of the present invention is to provide a virtual object display system which can display a virtual object with a simple method.

(1) A virtual object display system (for example, a virtual object display system 10 which will be described later) according to the present invention which includes a machine configuration management device (for example, a machine configuration management device 100 which will be described later) and an augmented information controller (for example, a augmented information controller 200 which will be described later), in which the machine configuration management device includes a graph generation portion (for example, a graph generation portion 111 which will be described later), a control point coordinate system insertion portion (for example, a control point coordinate system insertion portion 113 which will be described later), a node information notification portion (for example, a node information notification portion 114 which will be described later), a transformation information calculation portion (for example, a transformation information calculation portion 115 which will be described later) and a transformation information notification portion (for example, a transformation information notification portion 116 which will be described later) and in which the augmented information controller includes a node selection portion (for example, a node selection portion 211 which will be described later), a selection node notification portion (for example, a selection node notification portion 212 which will be described later) and a coordinate information transformation portion (for example, a coordinate information transformation portion 213 which will be described later), where the graph generation portion generates, as a machine configuration of a control target, a graph in which constituent elements including a camera are nodes, the control point coordinate system insertion portion inserts a control point and a coordinate system into the graph, the node information notification portion notifies information of a node which can be displayed to the augmented information controller, the node selection portion selects a node on which a virtual object is desired to be displayed, the selection node notification portion notifies the node on which the virtual object is desired to be displayed to the machine configuration management device, the transformation information calculation portion calculates transformation information which includes, as a variable, a coordinate value of a control axis node on a path in the graph from a camera node to a node of a display target and which is used for calculating a position and/or a posture of the node of the display target in a coordinate system of the camera node based on the graph, the transformation information notification portion notifies the transformation information to the augmented information controller and the coordinate information transformation portion uses the transformation information so as to transform the coordinate value of a control axis which is notified into the position and/or the posture of the node of the display target in the coordinate system of the camera node.

(2) Preferably, the virtual object display system (for example, a virtual object display system 10 which will be described later) according to (1) further includes a display device (for example, a display device 300 which will be described later), where the augmented information controller (for example, an augmented information controller 200 which will be described later) further includes: an augmented information display data calculation portion (for example, an augmented information display data calculation portion 214 which will be described later) which calculates, based on the position and/or the posture of the node of the display target in the coordinate system of the camera node, augmented information display data for calculating, with the display device, the virtual object as augmented information; and an augmented information display data notification portion (for example, an augmented information display data notification portion 215 which will be described later) which notifies the augmented information display data to the display device.

(3) Preferably, in the virtual object display system (for example, a virtual object display system 10 which will be described later) according to (1) or (2), the coordinate information transformation portion (for example, a coordinate information transformation portion 213 which will be described later) transforms, as the coordinate value of the control axis, a coordinate value received from a numerical controller (for example, a numerical controller 150 which will be described later) into the position and/or the posture of the node of the display target in the coordinate system of the camera node.

(4) Preferably, in the virtual object display system (for example, a virtual object display system 10 which will be described later) according to any one of (1) to (3), the augmented information controller (for example, an augmented information controller 200 which will be described later) further includes a storage portion (for example, a storage portion 220 which will be described later) having data of the graph.

(5) Preferably, the virtual object display system (for example, a virtual object display system 10 which will be described later) according to any one of (1) to (4), further includes a server which stores data of the graph.

(6) Preferably, in the virtual object display system (for example, a virtual object display system 10 which will be described later) according to any one of (1) to (5), the machine configuration management device (for example, a machine configuration management device 100 which will be described later) is integrated with a numerical controller (for example, a numerical controller 150 which will be described later) of a machine tool (for example, a machine tool 400 which will be described later).

(7) Preferably, in the virtual object display system (for example, a virtual object display system 10 which will be described later) according to any one of (1) to (5), the machine configuration management device (for example, a machine configuration management device 100 which will be described later) is present on a cloud.

According to the present invention, it is possible to display a virtual object with a simple method.

BRIEF DESCRIPTION OF THE DRAWINGS

FIG. 9B is an illustrative diagram of the parent-child relationship of the constituent elements of a machine in the embodiment of the present invention;

FIG. 16 is a diagram showing an operation flow of inserting the control point into the machine configuration tree in the embodiment of the present invention;

DETAILED DESCRIPTION OF THE INVENTION

Figure 1:
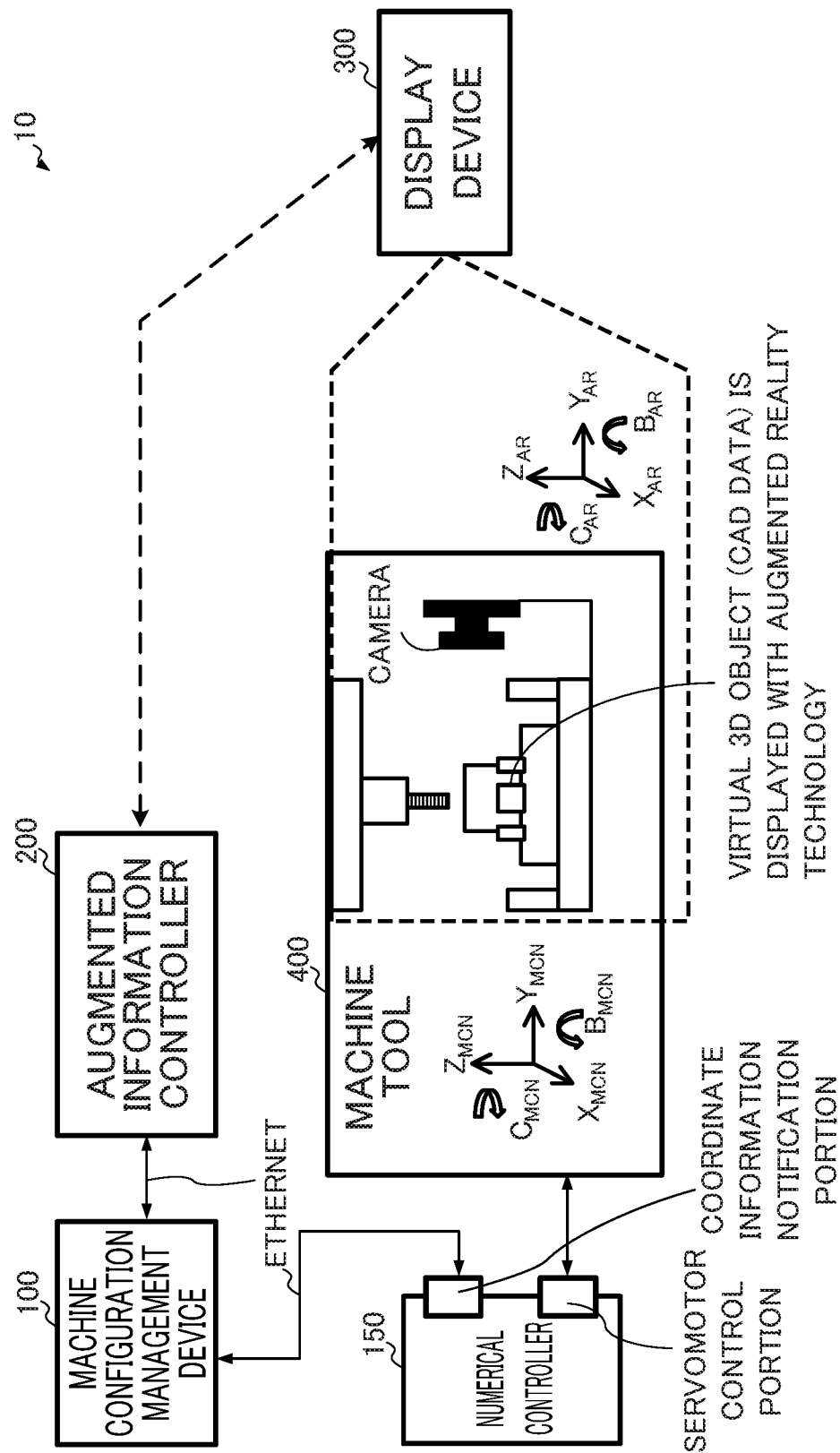
FIG. 1 is a block diagram showing a basic configuration of an entire embodiment of the present invention.

1. Configuration of Virtual Object Display System

An embodiment of the present invention will then be described in detail with reference to drawings. The configuration of the entire present embodiment will first be described with reference to FIG. 1.

A virtual object display system 10 according to the present embodiment includes a machine configuration management device 100, a numerical controller 150, an augmented information controller 200, a wireless communication device, a display device 300 and a machine tool 400.

The machine configuration management device 100 is a device specific to the present embodiment, produces a graph (hereinafter also referred to as the "machine configuration tree") in which the constituent elements of the machine tool 400 are nodes and uses the graph to manage a machine configuration, and thus the augmented information controller 200 which will be described later can perform control by utilization of data of the machine configuration based on the machine configuration tree.

More specifically, the machine configuration management device 100 uses a method described in <5. Generation of machine configuration tree> which will be described later so as to generate the machine configuration tree representing the configuration of the machine tool 400, and furthermore, additionally registers the camera as a node of the machine configuration tree, according to the method described in <5. Generation of Machine Configuration Tree> described later. Since the machine configuration tree has mutual position relationship information of the individual nodes, the camera is included as the node on the machine configuration tree, and thus in the augmented information controller 200 which will be described later, for all the nodes on the machine configuration tree, the relationship of position/posture with the camera is found. The detailed configuration of the machine configuration management device 100 will be described later with reference to FIG. 2.

The numerical controller 150 is a device which has a function as a general numerical controller and a function of communicating with the machine configuration management device 100. The numerical controller 150 is connected to the machine tool 400 so as to be able to communicate therewith. The numerical controller 150 uses the amounts of movement of individual control axes output based on a machining program incorporated in the numerical controller 150 itself and thereby controls the machine tool 400 so as to machine a workpiece.

The numerical controller 150 outputs, to the augmented information controller 200, the amounts of movement of the individual control axes output based on the machining program. As described above, the numerical controller 150 outputs the amounts of movement both to the machine configuration management device 100 and the machine tool 400. In this point, the output of the amounts of movement from the numerical controller 150 to the machine configuration management device 100 may be performed in synchronization with or asynchronously with the output of the amounts of movement from the numerical controller 150 to the machine tool 400. The detailed configuration of the numerical controller 150 will be described later with reference to FIG. 3.

The augmented information controller 200 uses an augmented reality technology so as to calculate the display position and the display angle of a virtual object and thereby performs control for appropriately displaying the virtual object. The detailed configuration of the augmented information controller 200 will be described later with reference to FIG. 4.

The display device 300 acquires the virtual object outputted by the extended information control device 200, and the display position and posture thereof. Then, based on this acquired information, displays the virtual object on the display device 300. This acquired information becomes information corresponding to the camera coordinate system.

The machine tool 400 is a general machine tool, and moves/rotates the individual control axes according to the amounts of movement of the individual control axes output from the numerical controller 150. In addition, the camera fixed to the machine tool 400 outputs the information acquired by photography to the extended information control device 200.

In the present embodiment, in the configuration described above, a user references the virtual object displayed according to a camera coordinate system on the display of the display device 300, and also references, over the display, the actual structure of the machine tool 400 which is moved according to the amounts of movement of the individual control axes. In this way, the user can observe how a machining simulation is performed.

The configuration shown in FIG. 1 is simply an example. For example, it may be configured so as to realize the display device 300 by way of a tablet-type terminal. Part or the whole of the functions of the machine configuration management device 100 may be incorporated in the numerical controller 150. Part or the whole of the functions of the augmented information controller 200 may be incorporated in the display device 300 or the numerical controller 150. Although the augmented information controller 200 may be realized by a single device, the augmented information controller 200 may be realized by a combination of a plurality of devices. Although the augmented information controller 200 may be realized by a device installed in the vicinity of the numerical controller 150 or the machine tool 400, the augmented information controller 200 may be realized by a server device or the like installed far away from the numerical controller 150 or the machine tool 400 through a network. Furthermore, individual communication connections may be wired connection or wireless connection. For example, although in the figure, the example where the communication connections of the machine configuration management device 100, the numerical controller 150 and the augmented information controller 200 are performed by wired connection in conformity with Ethernet (registered trade mark) is shown, the connections may be wireless connection.

2. Configuration of Machine Configuration Management Device

Figure 2:
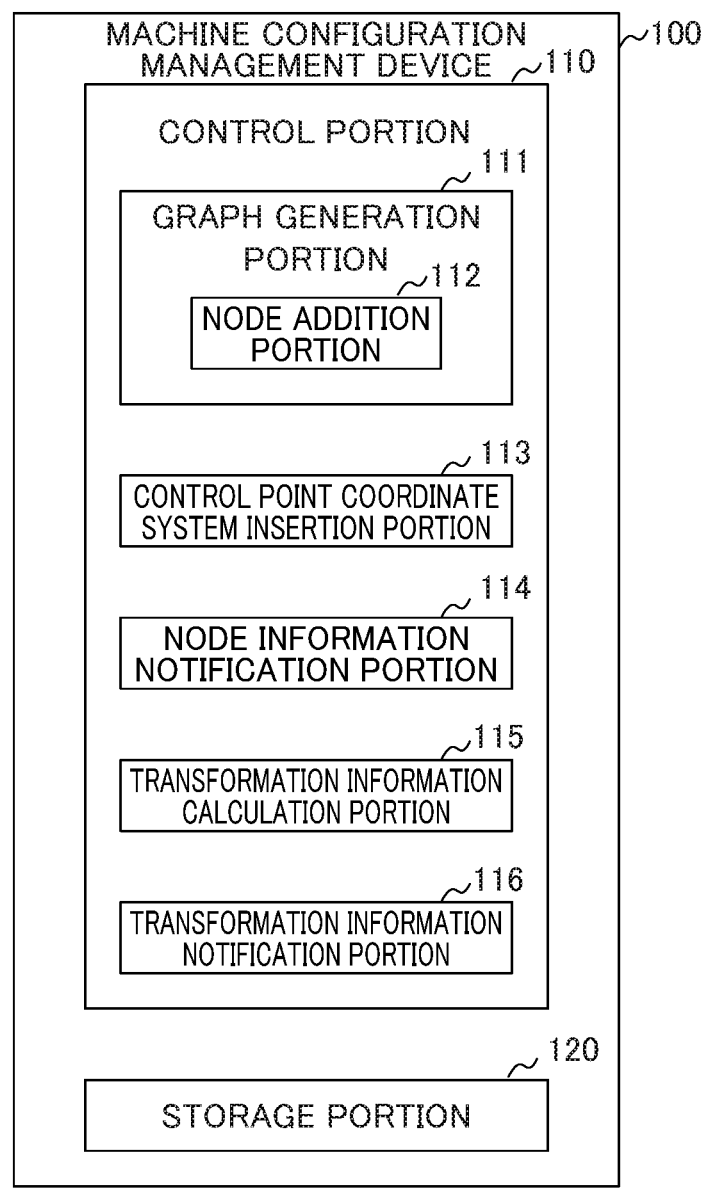
FIG. 2 is a functional block diagram of a machine configuration management device 100 according to the embodiment of the present invention.

FIG. 2 is a functional block diagram of the machine configuration management device 100. The machine configuration management device 100 includes a control portion 110 and a storage portion 120, the control portion 110 includes a graph generation portion 111, a control point coordinate system insertion portion 113, a node information notification portion 114, a transformation information calculation portion 115 and a transformation information notification portion 116 and the graph generation portion 111 includes a node addition portion 112.

The control portion 110 is a processor which comprehensively controls the machine configuration management device 100. The control portion 110 reads, through a bus, a system program and an application program stored in a ROM (unillustrated), and realizes, according to the system program and the application program, the functions of the graph generation portion 111, the node addition portion 112, the control point coordinate system insertion portion 113, the node information notification portion 114, the transformation information calculation portion 115 and the transformation information notification portion 116 included in the control portion 110.

The graph generation portion 111 generates, in a graph form, the machine configuration of the machine tool 400 including a camera. Furthermore, the node addition portion 112 included in the graph generation portion 111 adds nodes to the generated graph. The detailed operation thereof will be described in detail in "5. Generation of machine configuration tree" below.

The control point coordinate system insertion portion 113 inserts a control point and a coordinate system into the graph of the machine configuration. The detailed operation thereof will be described in detail in "6. Automatic insertion of control point and coordinate value" below.

The node information notification portion 114 notifies the augmented information controller 200 which will be described later of information of nodes which can be displayed.

As will be described later, the transformation information calculation portion 115 receives a notification of a node on which the virtual object is desired to be displayed from a selection node notification portion 212 of the augmented information controller 200, and thereafter calculates transformation information which includes, as a variable, a coordinate value of a control axis node on a path from a camera node to a node of a display target and which is used for calculating the position and/or the posture of the node of each display target in the coordinate system of the camera node based on the graph. The transformation information described above may have a matrix form, a vector form or a roll-pitch-yaw form. The detailed operation thereof will be described in detail in "7. Calculation of transformation information" below.

The transformation information notification portion 116 notifies the transformation information calculated by the transformation information calculation portion 115 to a coordinate information transformation portion 213 of the augmented information controller 200.

The storage portion 120 stores information on the machine configuration tree generated by the graph generation portion 111.

The detailed operations of the graph generation portion 111, the node information notification portion 114, the transformation information calculation portion 115, the transformation information notification portion 116 and the storage portion 120 will be described in detail in "8. Method of displaying virtual object" below.

3. Configuration of Numerical Controller

Figure 3:
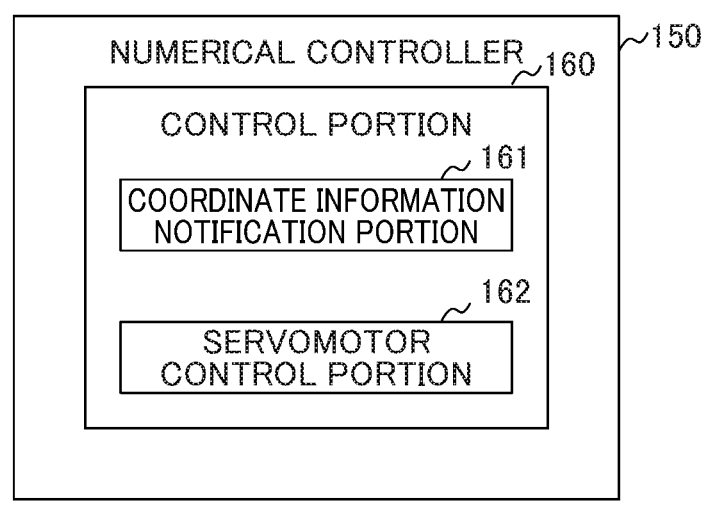
FIG. 3 is a functional block diagram of a numerical controller 150 according to the embodiment of the present invention.

FIG. 3 is a functional block diagram of the numerical controller 150. The numerical controller 150 includes a control portion 160, and the control portion 160 includes a coordinate information notification portion 161 and a servomotor control portion 162.

The control portion 160 is a processor which comprehensively controls the numerical controller 150. The control portion 160 reads, through a bus, a system program and an application program stored in the ROM (unillustrated), and realizes, according to the system program and the application program, the functions of the coordinate information notification portion 161 and the servomotor control portion 162 included in the control portion 160.

The coordinate information notification portion 161 notifies coordinate information of the machine tool 400 being operated to the coordinate information transformation portion 213 of the augmented information controller 200. The servomotor control portion 162 receives a movement command amount of each axis from the control portion 160, and outputs the command of each axis to a servomotor (unillustrated).

Although the numerical controller 150 includes other constituent elements included in a normal numerical controller in order to perform numerical control on the machine tool 400, the description thereof will be omitted.

4. Configuration of Augmented Information Controller

Figure 4:
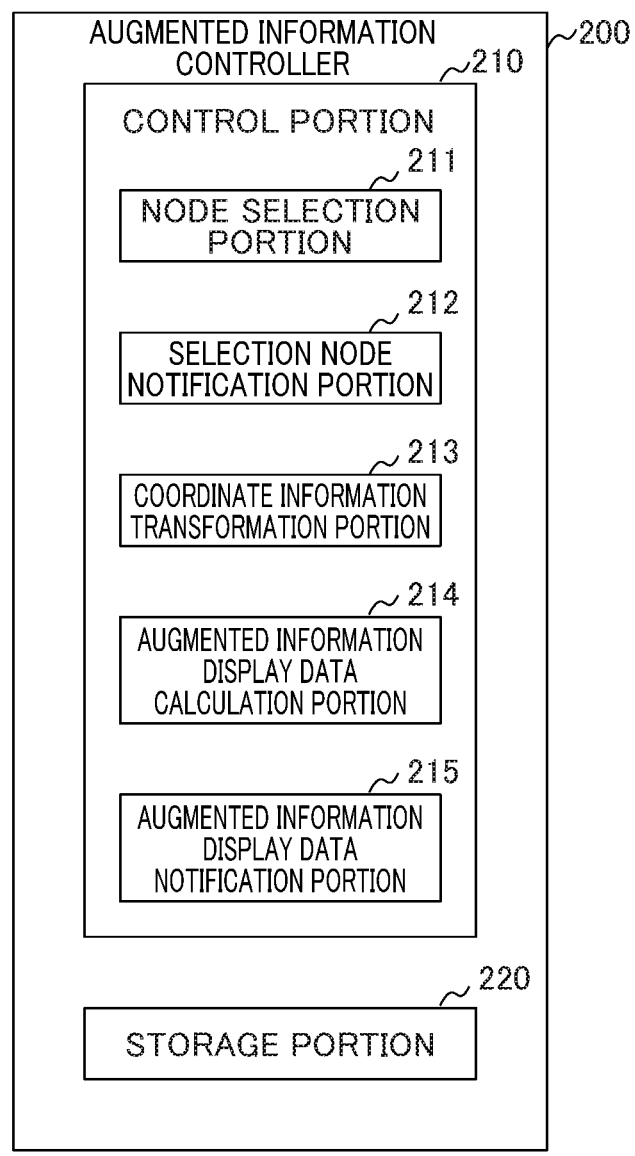
FIG. 4 is a functional block diagram of an augmented information controller 200 according to the embodiment of the present invention.

FIG. 4 is a functional block diagram of the augmented information controller 200. The augmented information controller 200 includes a control portion 210 and a storage portion 220, and the control portion 210 includes a node selection portion 211, the selection node notification portion 212, the coordinate information transformation portion 213, an augmented information display data calculation portion 214 and an augmented information display data notification portion 215.

The control portion 210 is a processor which comprehensively controls the augmented information controller 200. The control portion 210 reads, through a bus, a system program and an application program stored in the ROM (unillustrated), and realizes, according to the system program and the application program, the functions of the node selection portion 211, the selection node notification portion 212, the coordinate information transformation portion 213, the augmented information display data calculation portion 214 and the augmented information display data notification portion 215 included in the control portion 210.

The node selection portion 211 selects a node on which the virtual object is desired to be displayed.

The selection node notification portion 212 notifies the node selected by the node selection portion 211 to the transformation information calculation portion 115 of the machine configuration management device 100.

The coordinate information transformation portion 213 calculates the position and/or the posture of the virtual object in the camera coordinate system from the coordinate value of each control axis periodically received from the numerical controller 150 based on the transformation information received from the machine configuration management device 100.

The augmented information display data calculation portion 214 calculates, based on the technology of AR, MR or the like, augmented information display data for displaying the augmented information of the virtual object and the like. More specifically, the augmented information display data calculation portion 214 transform the position and/or the posture of the virtual object in the camera coordinate system into the position and/or the posture in the screen coordinate system.

The augmented information display data notification portion 215 transmits the augmented information display data calculated by the augmented information display data calculation portion 214 to the display device 300 through the wireless communication device. The augmented information display data includes the shape and the like of the virtual object and the display position, the display angle and the like of the virtual object transformed into coordinate values in the screen coordinate system. In addition, transmission of the augmented information display data may be done wirelessly, or may be wired.

The storage portion 220 stores information on the graph generated by the graph generation portion 111 of the machine configuration management device 100.

The detailed operations of the node selection portion 211, the selection node notification portion 212, the coordinate information transformation portion 213, the augmented information display data calculation portion 214, the augmented information display data notification portion 215 and the storage portion 220 will be described in detail in "8. Method of displaying virtual object" below.

5. Generation of Machine Configuration Tree

The machine configuration management device 100 according to the embodiment of the present invention first generates the graph showing the machine configuration. A method of generating a machine configuration tree as an example of the graph will be described in detail with reference to FIGS. 5 to 11.

Figure 5:
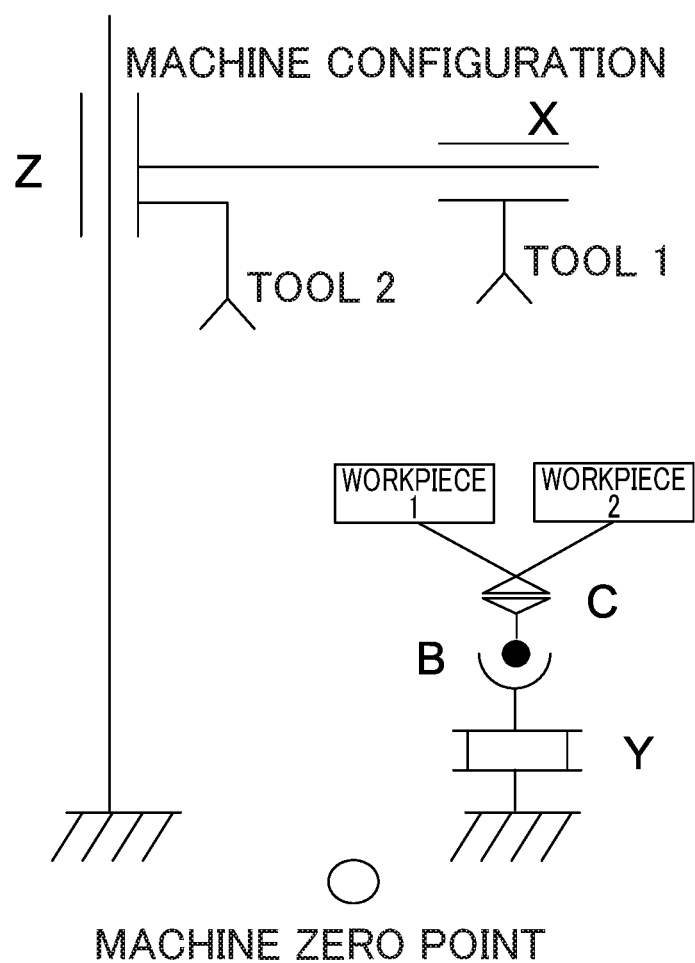
FIG. 5 is an illustrative diagram of a method of generating a machine configuration tree in the embodiment of the present invention.

As the example, the method of generating the machine configuration tree representing the configuration of a machine shown in FIG. 5 will be described. In the machine of FIG. 5, it is assumed that an X axis is set perpendicular to a Z axis, that a tool 1 is installed in the X axis and that a tool 2 is installed in the Z axis. On the other hand, it is assumed that a B axis is set on a Y axis, that a C axis is set on the B axis and that a workpiece 1 and a workpiece 2 are installed in the C axis. The method of representing the machine configuration as the machine configuration tree will be described below.

Figure 6:
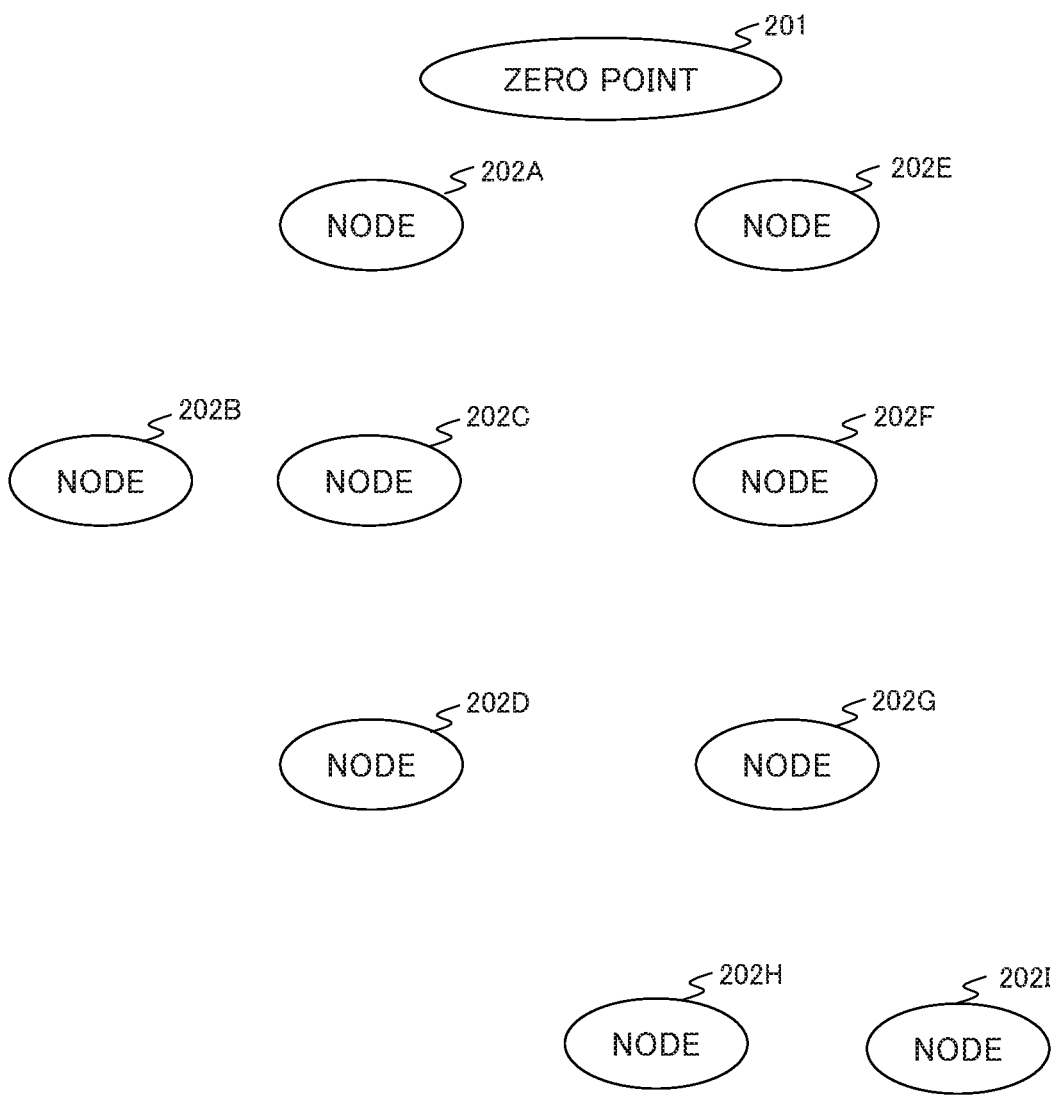
FIG. 6 is an illustrative diagram of the method of generating the machine configuration tree in the embodiment of the present invention.

First, as shown in FIG. 6, only a zero point 201 and nodes 202A to 202I are arranged. In this stage, there is no connection between the zero point 201 and the nodes 202 and between the nodes 202, and the names of the zero point and the nodes are not set.

Figure 7:
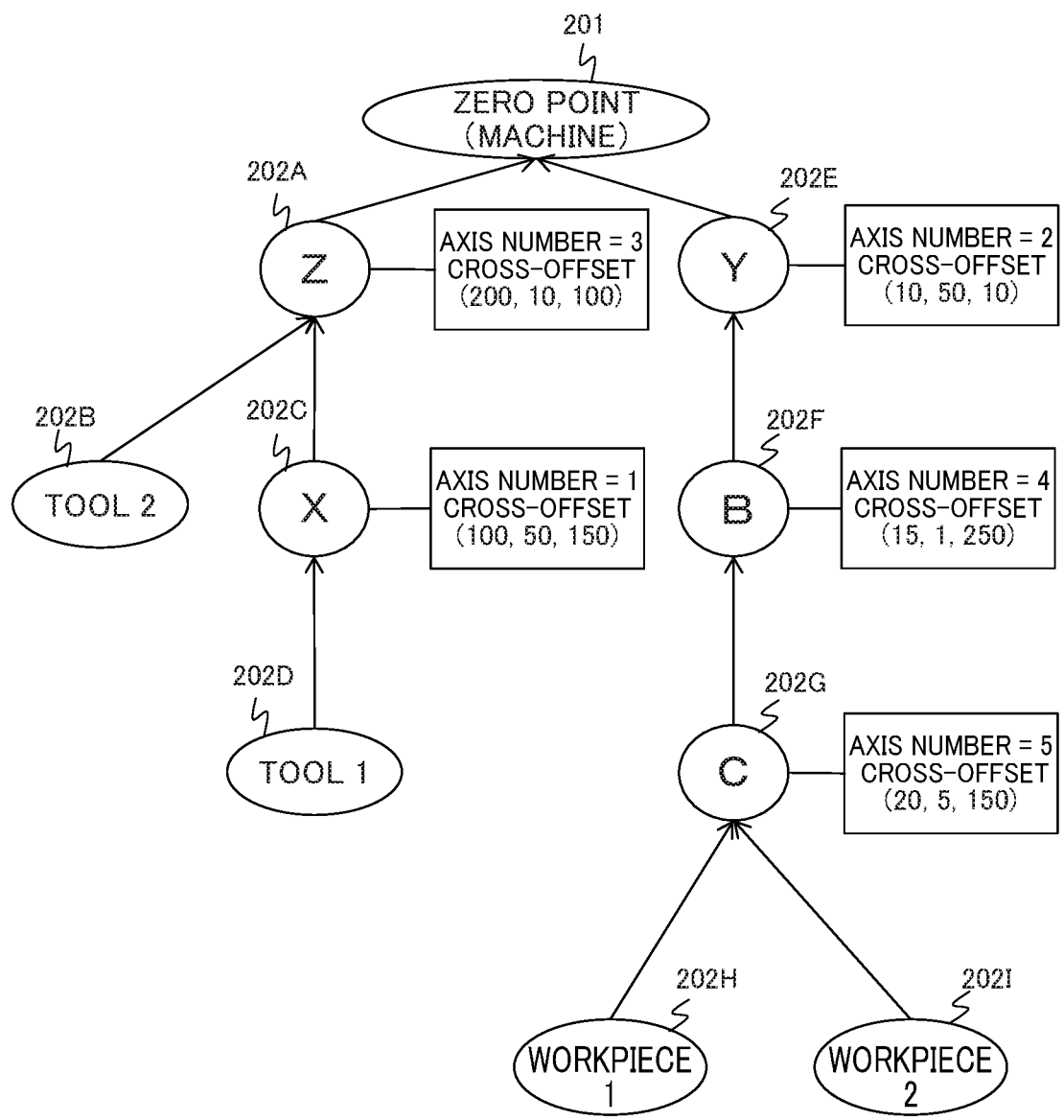
FIG. 7 is an illustrative diagram of the method of generating the machine configuration tree in the embodiment of the present invention.

Then, the axis names (axis types) of the individual axes, the names of the individual tools, the names of the individual workpieces, the names of the individual zero points and the physical axis numbers (axis types) of the individual axes are set. Then, the parent nodes (axis types) of the individual axes, the parent nodes of the individual tools and the parent nodes of the individual workpieces are set. Finally, the cross-offsets (axis types) of the individual axes, the cross-offsets of the individual tools and the cross-offsets of the individual workpieces are set. Consequently, the machine configuration tree shown in FIG. 7 is generated.

Each node of the machine configuration tree is not limited to the pieces of information described above, and it may or may not have information related to, for example, an identifier (name), the identifier of the parent node of itself, the identifiers of all child nodes whose parents are itself, a relative offset (cross-offset) with respect to the parent node, a relative coordinate value with respect to the parent node, a relative movement direction (unit vector) with respect to the parent node, node types (linear axis/rotary axis/unit (which will be described later)/control point/coordinate system/zero point and the like), the physical axis number and the transformation formulas of an orthogonal coordinate system and a physical coordinate system.

As described above, values are set to the individual nodes, and thus data which has a data structure in the shape of a machine configuration tree is generated within the machine configuration management device 100. Furthermore, even when another machine (or robot) is added, a zero point is added, and thus it is possible to further add nodes.

Figure 8:
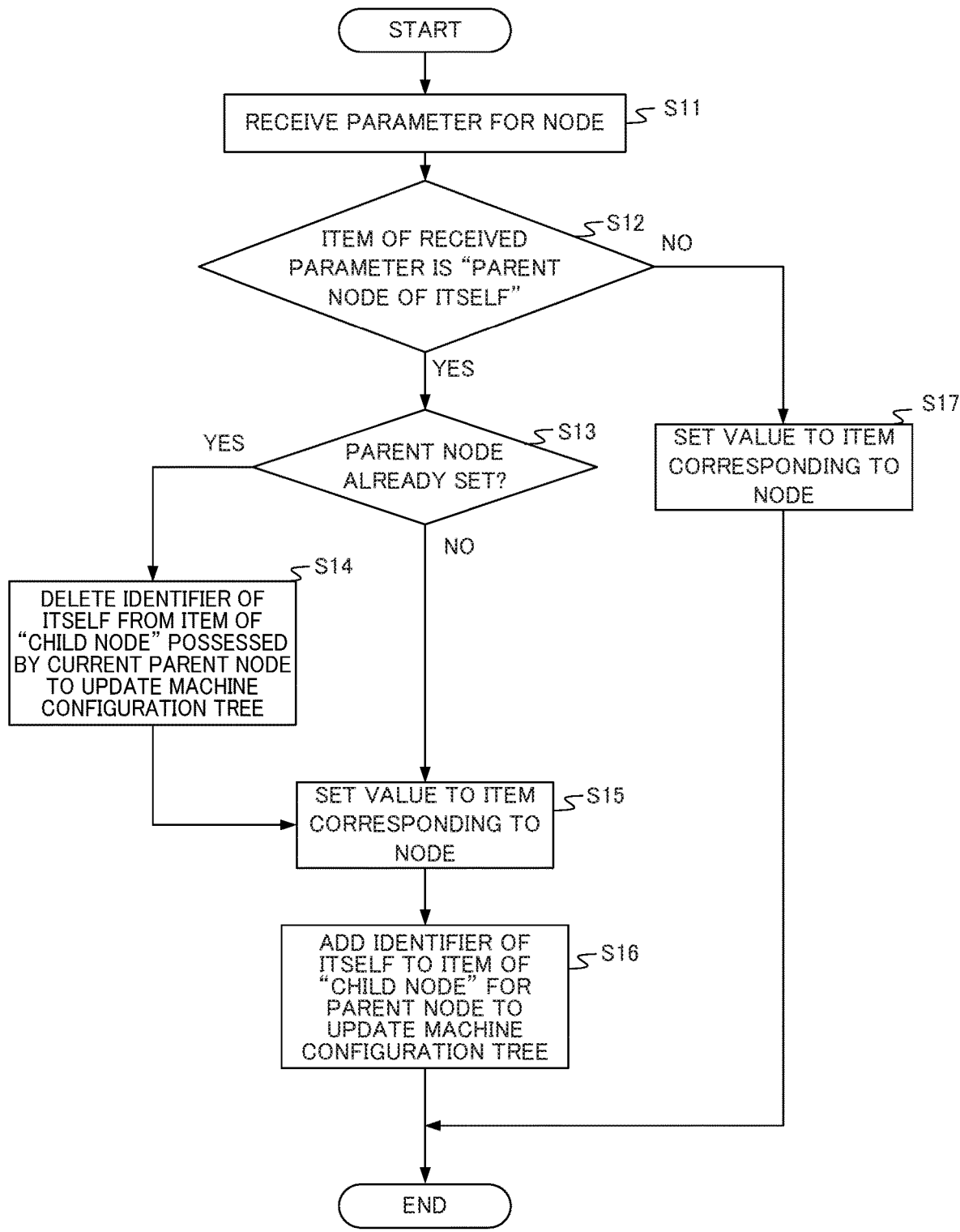
FIG. 8 is a flowchart showing the method of generating the machine configuration tree in the embodiment of the present invention.

A flowchart obtained by generalizing the method of generating the machine configuration tree described above, in particular, the method of setting the values to the individual nodes is shown in FIG. 8.

In step S11, the graph generation portion 111 receives the value of a parameter set to the node. When in step S12, the item of the set parameter is "parent node of itself" (yes in S12), the processing is transferred to step S13. When the item of the set parameter is not "parent node of itself" (no in S12), the processing is transferred to step S17.

When in step S13, a parent node has already been set to the node to which the parameter is set (yes in S13), the processing is transferred to step S14. When a parent node has not been set (no in S13), the processing is transferred to step S15.

In step S14, the graph generation portion 111 deletes the identifier of itself from the item of "child node" possessed by the current parent node of the node to which the parameter is set so as to update the machine configuration tree.

In step S15, the graph generation portion 111 sets the value to the corresponding item of the node to which the parameter is set.

In step S16, the graph generation portion 111 adds the identifier of itself to the item of "child node" in the parent node so as to update the machine configuration tree, and thereafter the flow is completed.

In step S17, the graph generation portion 111 sets the value to the corresponding item of the node to which the parameter is set, and thereafter the flow is completed.

Figure 9A:
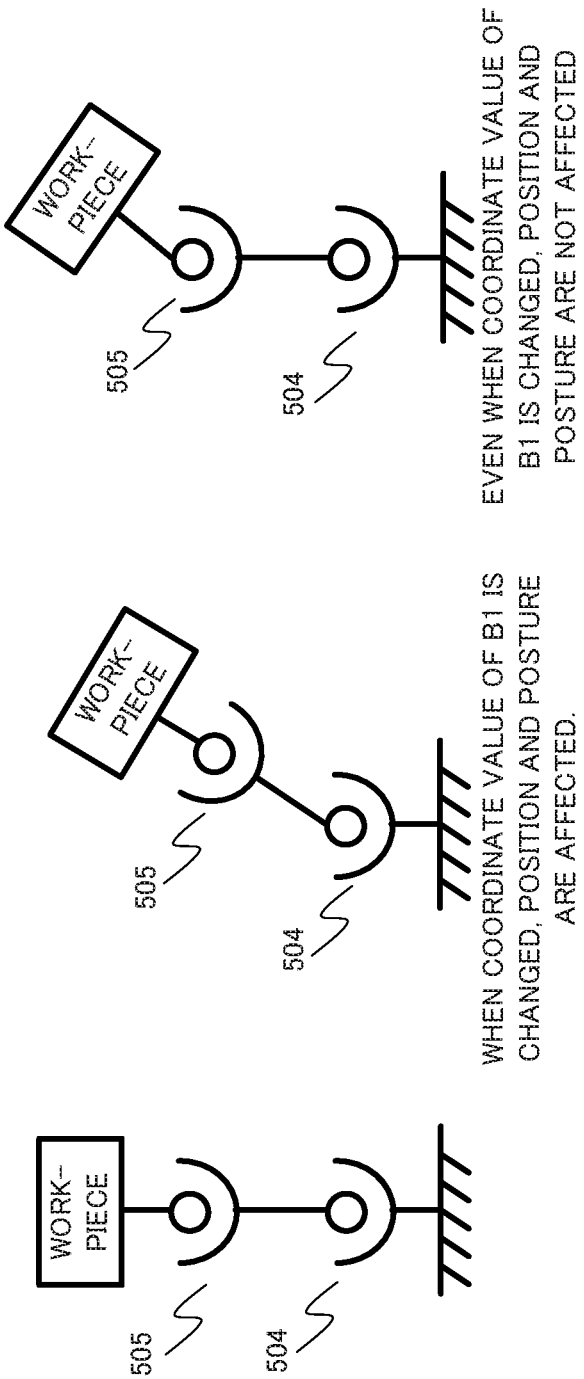
FIG. 9A is an illustrative diagram of a parent-child relationship of the constituent elements of a machine in the embodiment of the present invention.

The method of generating the data having the data structure in the shape of the machine configuration tree described above is used, and thus it is possible to set a parent-child relationship of the constituent elements of the machine. Here, the parent-child relationship refers to a relationship in which, for example, when as shown in FIG. 9A, two rotary axis nodes 504 and 505 are present, a variation in the coordinate value of the node 504 on one side unilaterally affects the geometric state (typically, the position and the posture) of the node 505 on the other side. In this case, the nodes 504 and 505 are said to have a parent-child relationship, the node 504 is referred to as a parent and the node 505 is referred to as a child. However, for example, as shown in FIG. 9B, in a machine configuration that is configured with two linear axis nodes 502 and 503 and four free joints 501, a mechanism is present in which as the coordinate value (length) of one of the nodes 502 and 503 is varied, not only the geometric state of the other node but also the geometric state of itself is varied, that is, the nodes affect each other. In such a case, both of them are parents and children, and in other words, the parent-child relationship can be regarded as being bidirectional.

Figure 10A:
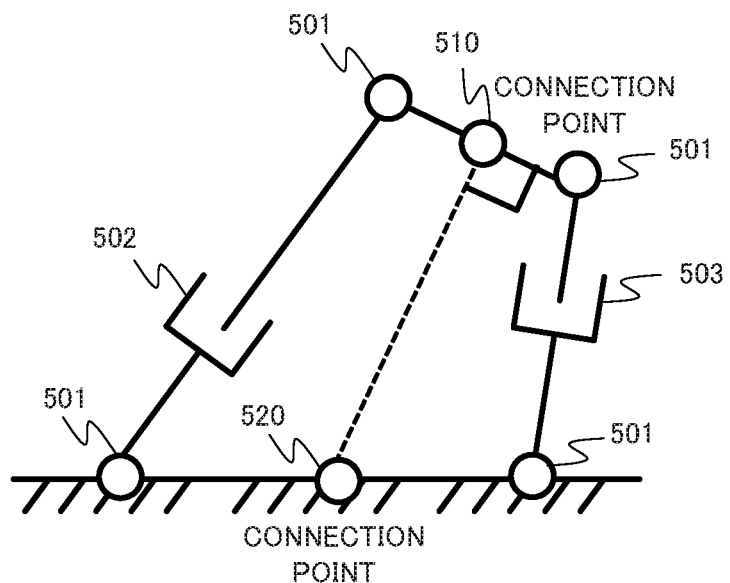
FIG. 10A is an illustrative diagram of a method of inserting a unit into the machine configuration tree.
Figure 10B:
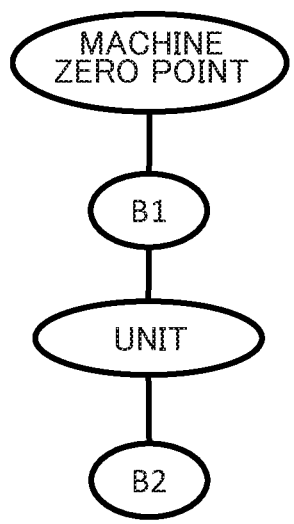
FIG. 10B is an illustrative diagram of the method of inserting the unit into the machine configuration tree.
Figure 10C:
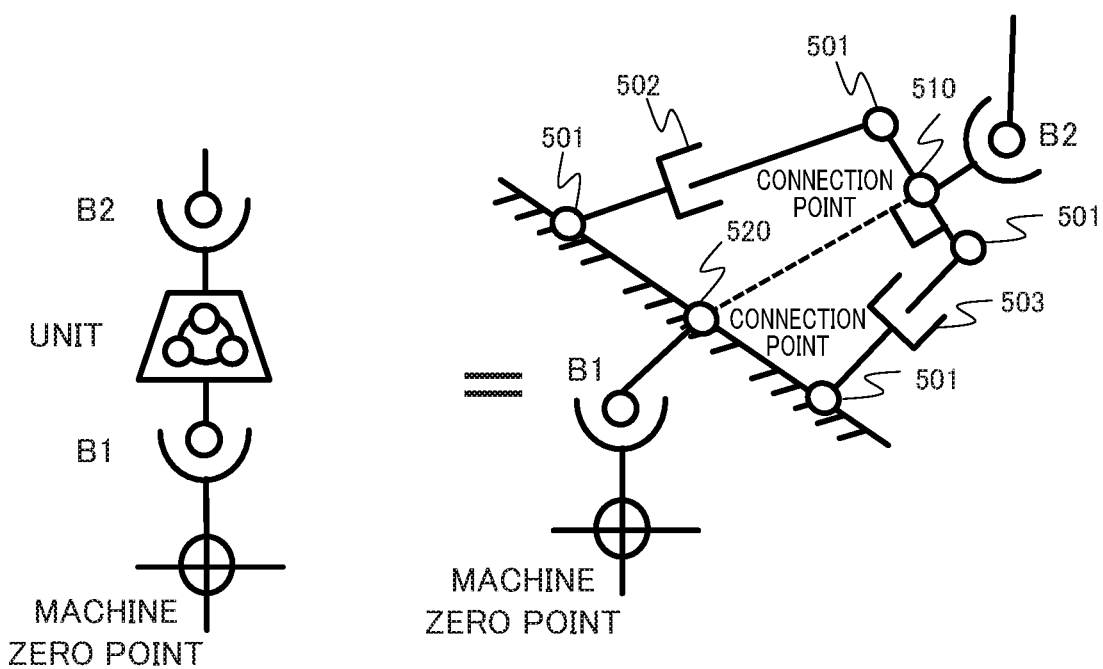
FIG. 10C is an illustrative diagram of the method of inserting the unit into the machine configuration tree.
Figure 11:
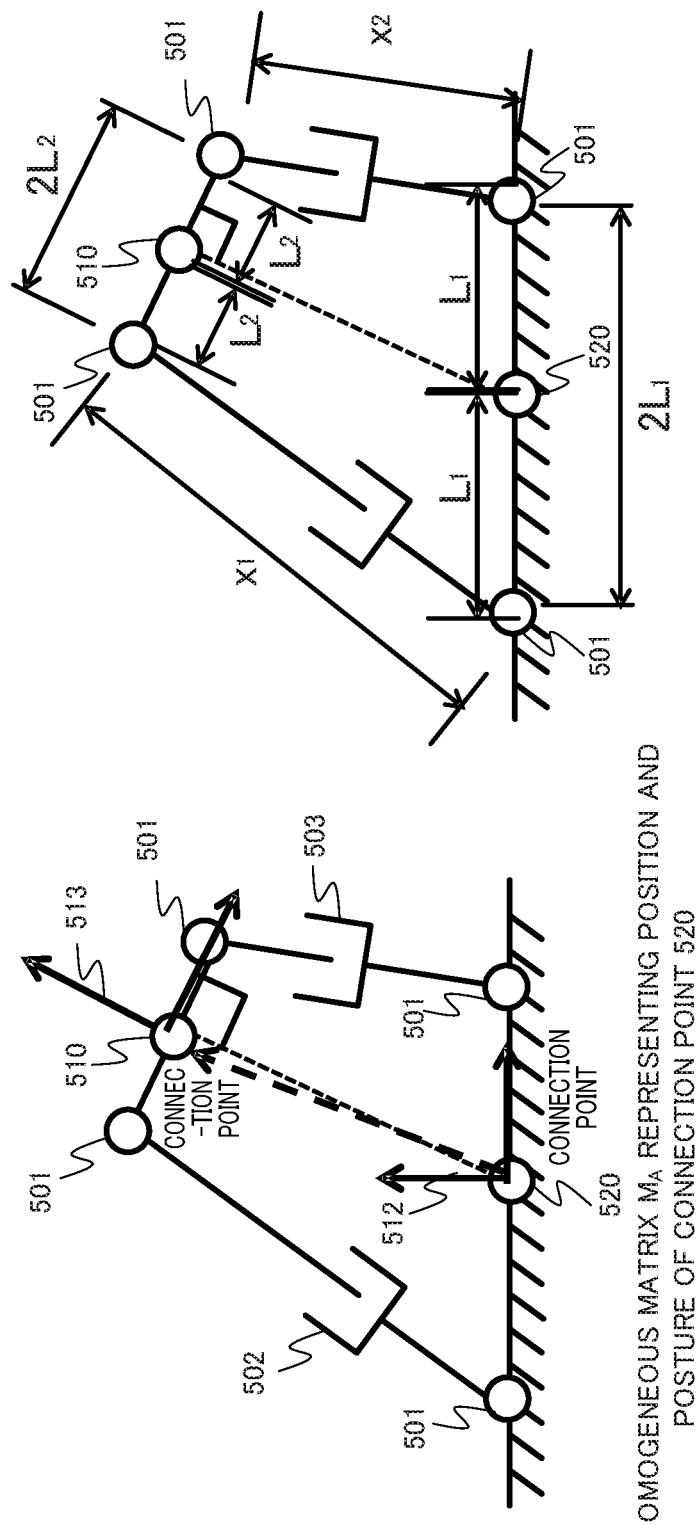
FIG. 11 is a diagram showing an example of a machine configuration according to the embodiment of the present invention.

As described above, a mechanism in which a variation in a certain node affects the other node is regarded as one unit in terms of convenience, this unit is inserted into the machine configuration tree and thus the entire machine configuration tree is generated. As shown in FIG. 10A, the unit has two connection points 510 and 520, and when the unit is inserted into the machine configuration tree as shown in FIG. 10B, as shown in FIG. 10C, the parent node is connected to the connection point 520, and the child node is connected to the connection point 510. The unit also has a transformation matrix from the connection point 520 to the connection point 510. This transformation matrix is indicated by the coordinate values of the individual nodes included in the unit. For example, in the case of a machine configuration as shown in FIG. 11, when a homogeneous matrix indicating the position and the posture of the connection point 520 is assumed to be $M_A$, and a homogeneous matrix indicating the position and the posture of the connection point 510 is assumed to be $M_B$, a transformation formula between the matrices is represented as follows by use of the coordinate values $x_1$ and $x_2$ of the linear axis nodes included in the unit.

When it is assumed that [Formula 1]

$$\theta = \sin^{-1}\left(\frac{x_1^2 - x_2^2}{4L_1 L_2}\right)$$

$$L = L_1 \cos\theta + \sqrt{0.5x_1^2 + 0.5x_2^2 - L_2^2 - L_1^2 \sin^2\theta}$$

it is represented by $$M_B = TM_A$$

where $$T = \begin{pmatrix} \sin\theta & 0 & \cos\theta & L\cos\theta \\ 0 & 1 & 0 & 0 \\ -\cos\theta & 0 & \sin\theta & L\sin\theta \\ 0 & 0 & 0 & 1 \end{pmatrix}$$

The unit indicating this machine configuration has a homogeneous transformation matrix such as T in the mathematical formula of [Formula 1] described above. The homogeneous matrix refers to a 4×4 matrix which can collectively represent the position and the posture as in the mathematical formula of [Formula 2] below.

[Formula 2]

$$\left( \begin{array}{c} \overbrace{\begin{bmatrix} \cos\theta & -\sin\theta & 0 \\ \sin\theta & \cos\theta & 0 \\ 0 & 0 & 1 \end{bmatrix}}^{\text{posture}} \overbrace{\begin{bmatrix} x \\ y \\ z \end{bmatrix}}^{\text{position}} \\ 0 \quad 0 \quad 0 \quad 1 \end{array} \right)$$

Even when the parent-child relationship is not mutual, in order for calculation processing or a setting to be simplified, a unit in which a plurality of nodes are previously integrated into one may be defined and configured into the machine configuration tree.

As described above, in the present embodiment, the graph of the machine configuration can include, as a constituent element, a unit in which a plurality of axes are integrated into one.

6. Automatic Insertion of Control Point and Coordinate System

In order to specify, as the control points, various positions on the machine configuration and set coordinate systems in various places on the machine configuration, the following method is performed by use of the machine configuration tree generated in "5. Generation of machine configuration tree" described above.

Figure 12A:
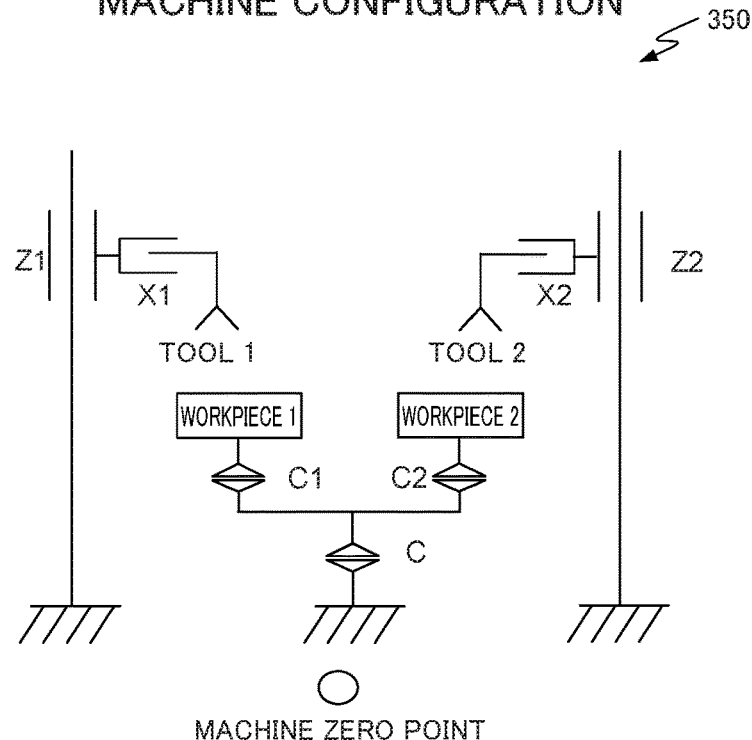
FIG. 12A is a diagram showing an example of the machine which is a target for the generation of the machine configuration tree.
Figure 12B:
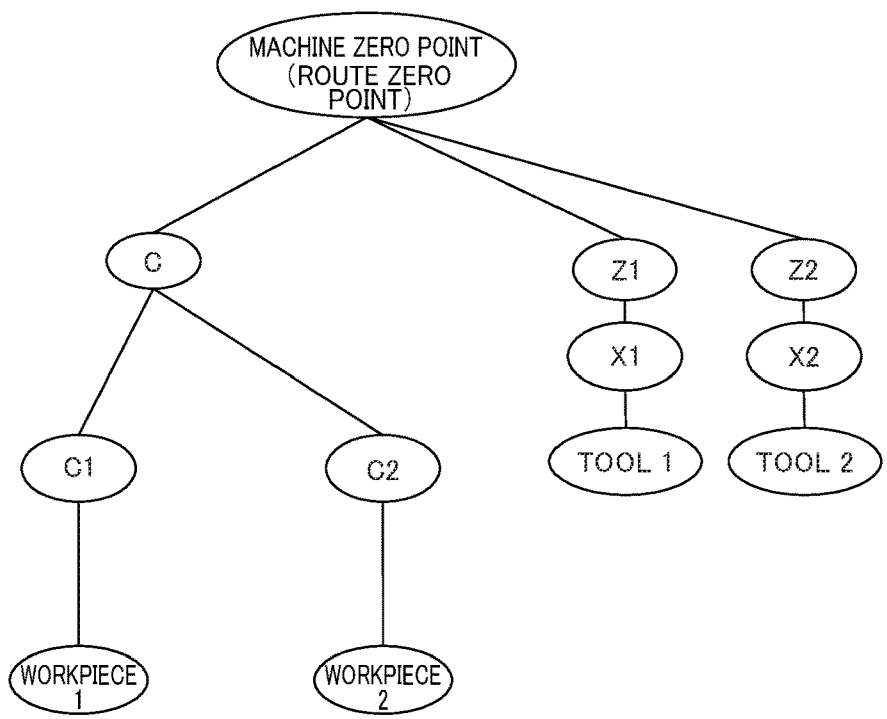
FIG. 12B is a diagram showing an example of a machine configuration tree corresponding to the machine which is the target for the generation of the machine configuration tree.

For example, in a rotary index machine 350 shown in FIG. 12A, an X1 axis is set perpendicular to a Z1 axis, and a tool 1 is installed in the X1 axis. An X2 axis is set perpendicular to a Z2 axis, and a tool 2 is installed on the X2 axis. Furthermore, it is assumed that in a table, on a C axis, a C1 axis and a C2 axis are set in parallel, and in the C1 axis and the C2 axis, a workpiece 1 and a workpiece 2 are respectively installed. When this machine configuration is represented by a machine configuration tree, the machine configuration tree shown in FIG. 12B is provided.

Figure 13:
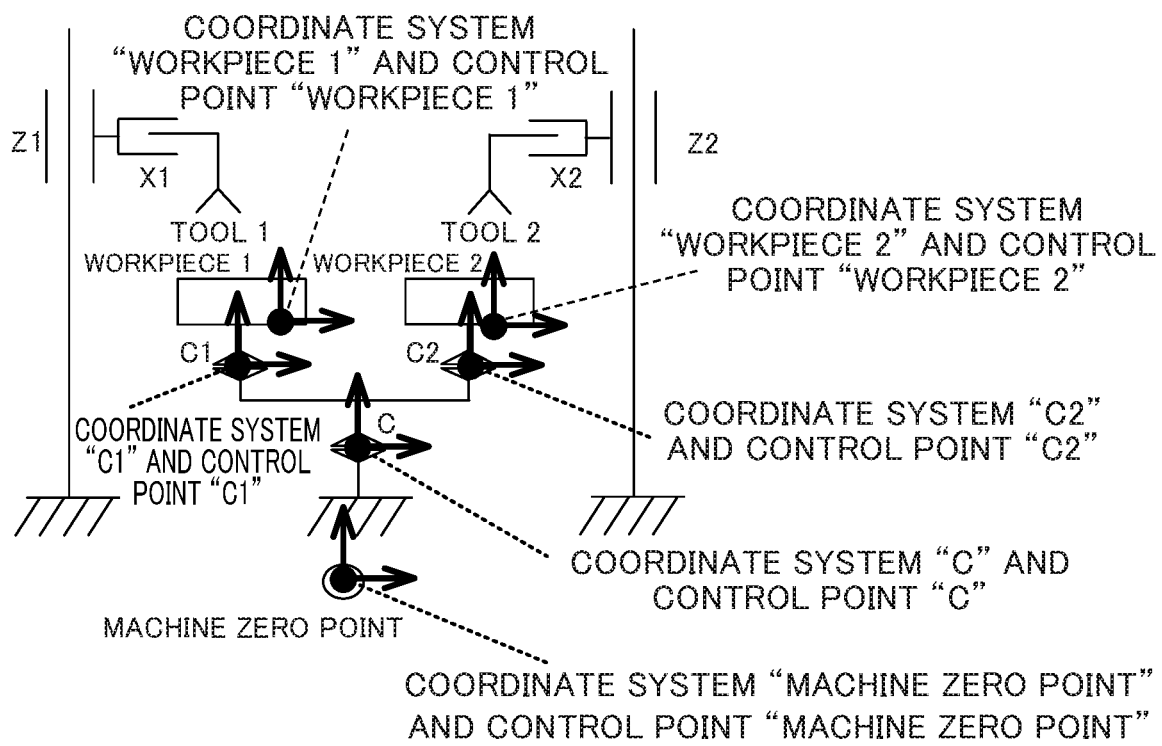
FIG. 13 is a diagram showing an example where a coordinate system and a control point are inserted into each node in the machine in the embodiment of the present invention.
Figure 14:
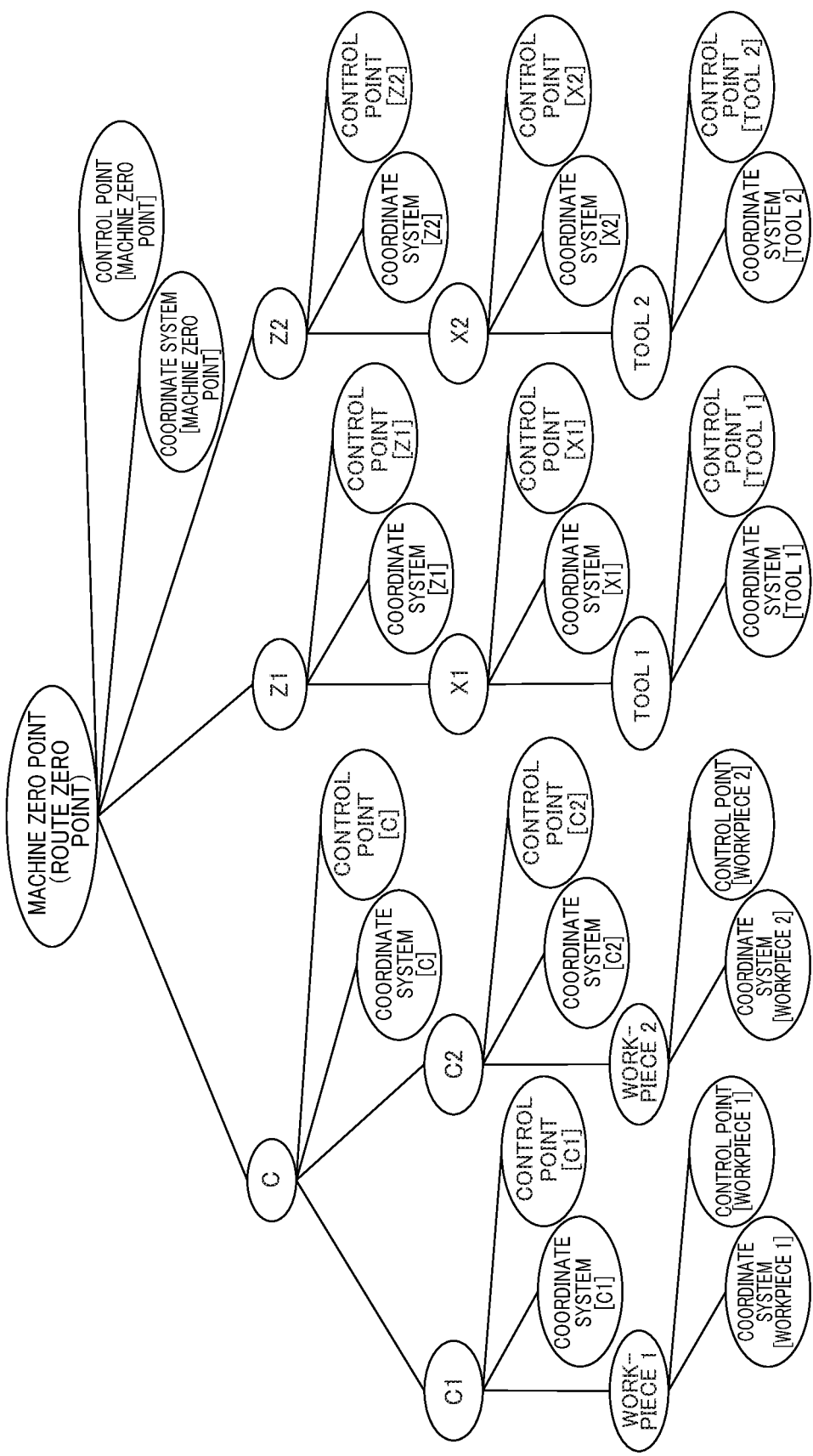
FIG. 14 is a diagram showing an example of the machine configuration tree into which the coordinate systems and the control points are inserted in the embodiment of the present invention.

In an example of a series of nodes leading from individual workpieces to the machine zero point, as shown in FIG. 13, a coordinate system and a control point are automatically inserted into each of the machine zero point, the C axis, the C1 axis, the C2 axis, the workpiece 1 and the workpiece 2. This is performed not only on the table but also on the series of nodes leading from individual tools to the machine zero point, that is, all the X1 axis, the X2 axis, the Z1 axis, the Z2 axis, the tool 1 and the tool 2. Consequently, as shown in FIG. 14, into all the nodes of the machine configuration tree, the control points and the coordinate systems corresponding to the individual nodes are automatically inserted. Normally, when machining is performed, the coordinate system is specified in the workpiece, and the tool is specified as the control point. In this way, for example, it is possible to cope with various cases such as a case where in order to move a workpiece itself to a predetermined position, the control point is desired to be specified in the workpiece and a case where in order to use a certain tool to polish another tool, the coordinate system is desired to be set in the tool itself.

Figure 15A:
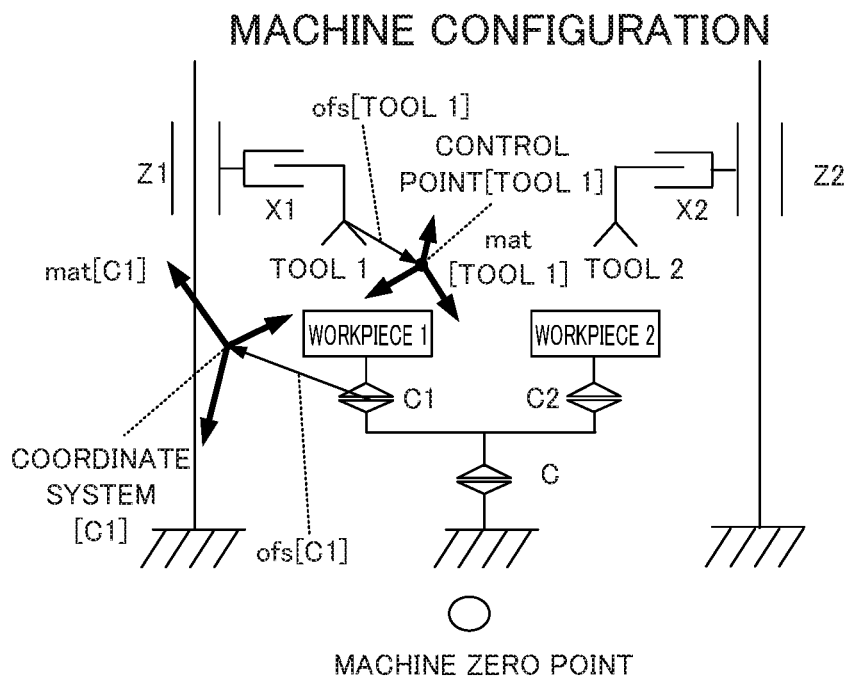
FIG. 15A is a diagram showing an example of the machine in which an offset and a posture matrix are inserted into each node in the embodiment of the present invention.
Figure 15B:
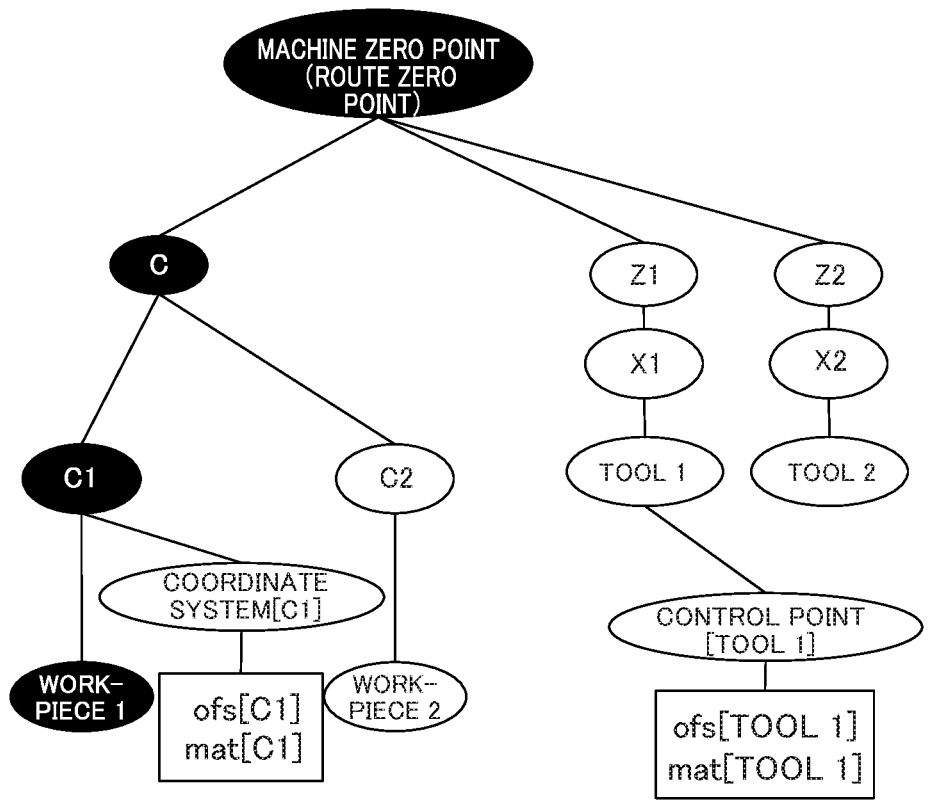
FIG. 15B is a diagram showing an example where the offset and the posture matrix are inserted into each node in the machine in the embodiment of the present invention.

As shown in FIG. 15A, each of the control points and the coordinate systems has an offset. Hence, a point away from the center of the node can be set to a control point or a coordinate system zero point. Furthermore, each of the control points and the coordinate systems has a posture matrix. When this posture matrix is the posture matrix of the control point, it indicates the posture (the direction, the inclination) of the control point whereas when this posture matrix is the posture matrix of the coordinate system, it indicates the posture of the coordinate system. In a machine configuration tree shown in FIG. 15B, the offset and the posture matrix are represented so as to be associated with the nodes corresponding thereto. Furthermore, each of the control points and the coordinate systems has information on whether or not the "move" and the "cross-offset" of the node present on a path up to the route of the machine configuration tree are individually added, and the information can be set.

A flowchart obtained by generalizing the method of automatically inserting the control point described above is shown in FIG. 16. Specifically, this flowchart includes a chart A and a chart B, and as will be described later, the chart B is performed in the middle of the chart A.

The chart A will first be described. In step S21, the graph generation portion 111 sets a machine configuration tree. In step S22, the chart B is performed, and the flow of the chart A is completed.

The chart B will then be described. In step S31 of the chart B, when the control point and the coordinate system have been inserted into the node (yes in S31), the flow is completed. When the control point and the coordinate system have not been inserted into the node (no in S31), the processing is transferred to step S32.

In step S32, the control point coordinate system insertion portion 113 inserts the control point and the coordinate system into the node, and stacks a variable n by 1. A setting is made such that n=1.

In step S33, when the nth child node is present in the node (yes in S33), the processing is transferred to step S34. When the $n^{th}$ child node is not present in the node (no in S33), the processing is transferred to step S36.

In step S34, on the $n^{th}$ child node, the chart B itself is performed in a recursive manner.

In step S35, n is incremented by 1. In other words, the increment is performed such that n=n+1, and the processing is returned to step S33.

In step S36, the variable n is popped by 1, and the flow of the chart B is completed.

Figure 17:
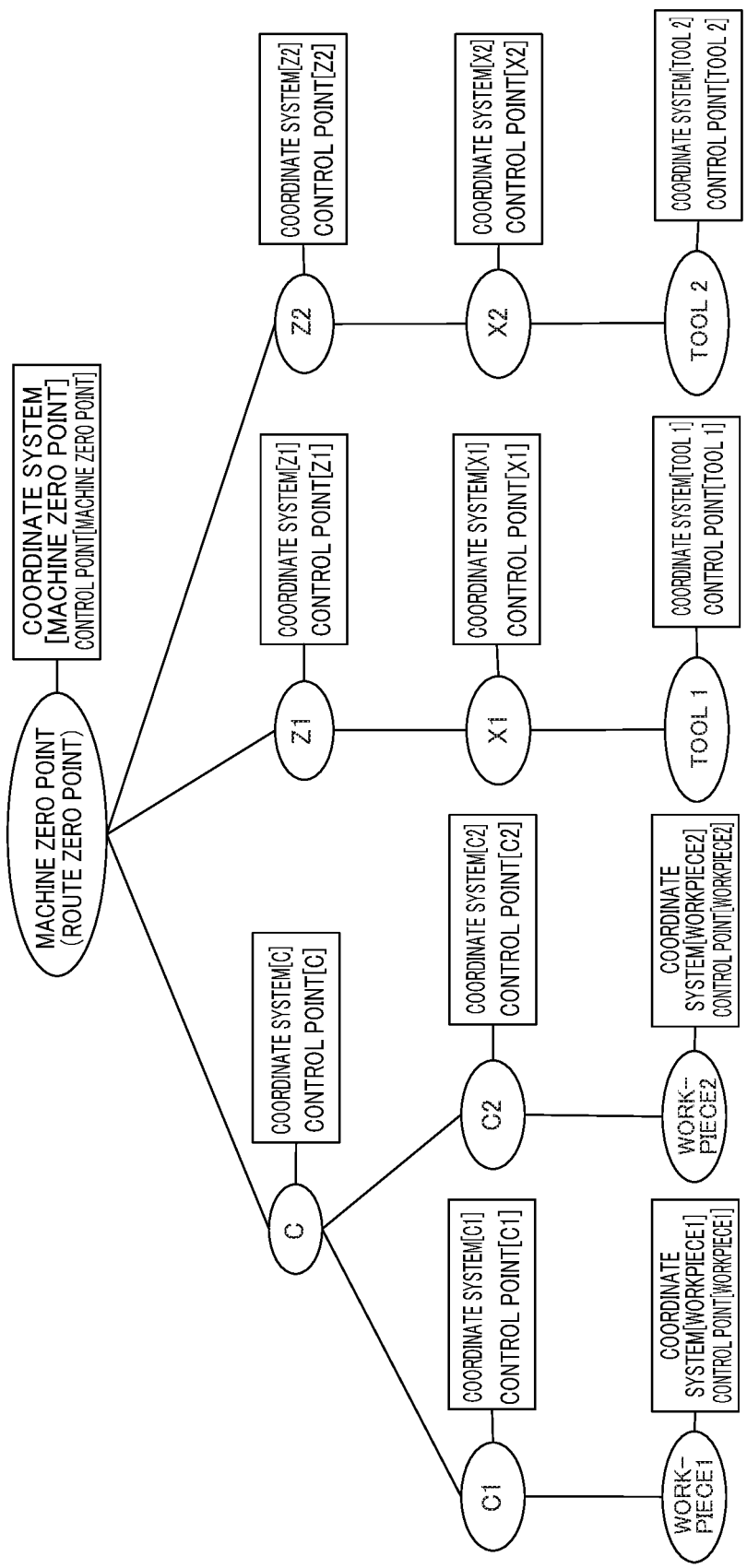
FIG. 17 is a diagram showing an example of the machine configuration tree into which the coordinate systems and the control points are inserted in the embodiment of the present invention.

By the method described above, the control point coordinate system insertion portion 113 inserts, as nodes, the control points and the coordinate systems into the individual nodes of the graph in the machine configuration. Although in the above description, the example where the control points and the coordinate systems are added as nodes is described, an embodiment is also possible in which as shown in FIG. 17, the control point coordinate system insertion portion 113 makes the individual nodes of the graph in the machine configuration have the control points and the coordinate systems as information.

7. Calculation of Transformation Information

As described above, the transformation information calculation portion 115 calculates the transformation information for transforming the coordinate value of the control axis into the position and/or the posture of the virtual object in the camera coordinate system. A method of calculating the transformation information will be described in detail with reference to FIGS. 18 and 19.

Figure 18:
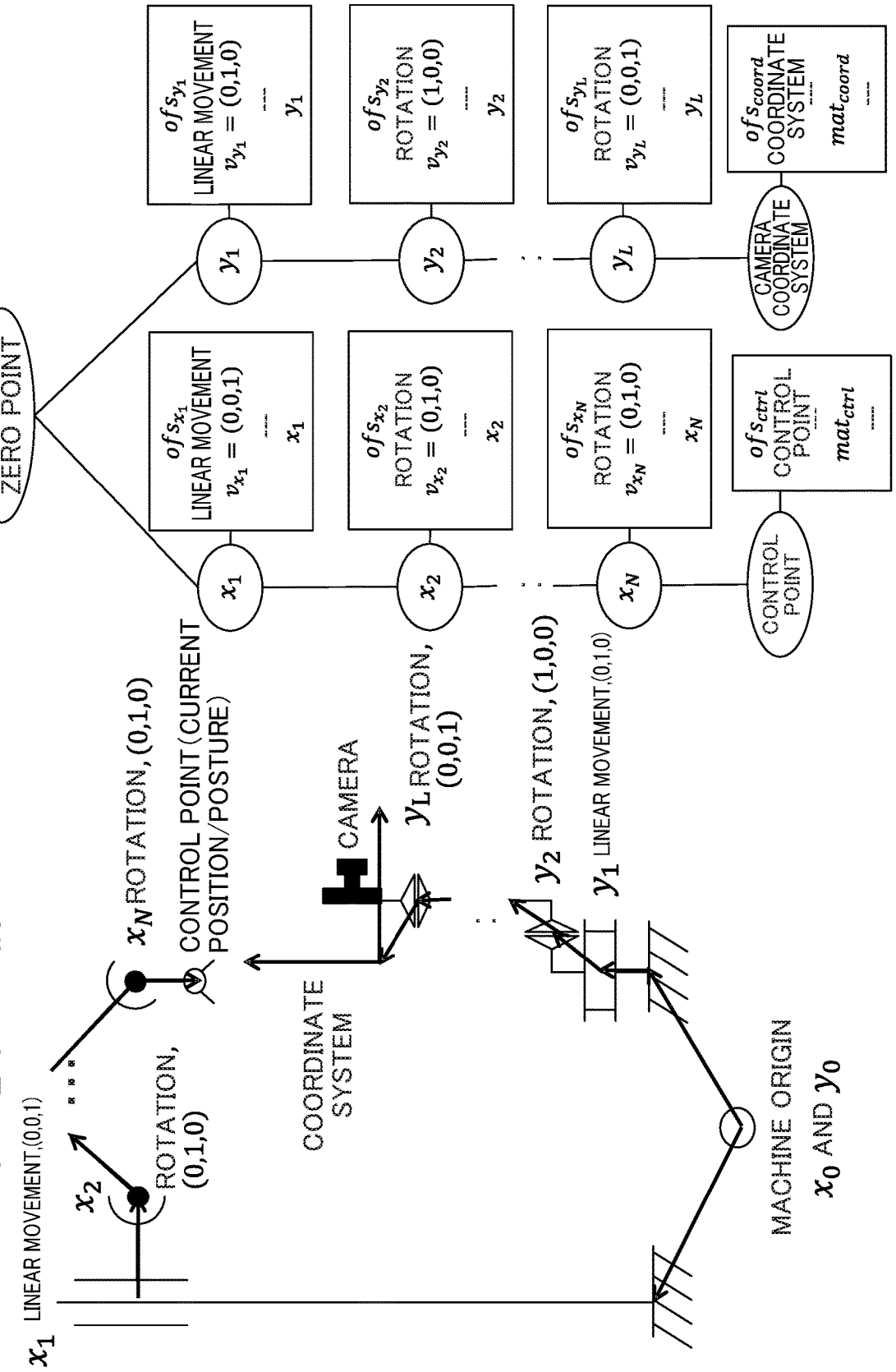
FIG. 18 is a diagram showing an example of information used when transformation information is generated in the embodiment of the present invention.

For example, as shown in FIG. 18, it is assumed that an axis $X_2$ is set on an axis $X_1$, that an axis $X_3$ is set on the axis $X_2$, that then, N nodes are likewise continuous and that the end thereof is an axis $X_N$. Furthermore, it is assumed that on the control point on the axis $X_N$, a virtual object is displayed. Likewise, it is assumed that an axis $y_2$ is set on an axis $y_1$, that an axis $y_3$ is set on the axis $y_2$, that then, L nodes are likewise continuous and that the end thereof is an axis $y_L$. Furthermore, it is assumed that on the axis $y_L$, a camera is installed. Here, although $X_i$ and $y_j$ are the names of nodes, it is assumed that they simultaneously indicate the coordinate values of the individual nodes.

Furthermore, it is assumed that the offset, the type of node (linear line/rotation/unit/control point/coordinate system), the axis direction, the posture matrix and the coordinate value shown in FIG. 18 are given to the individual nodes.

Figure 19:
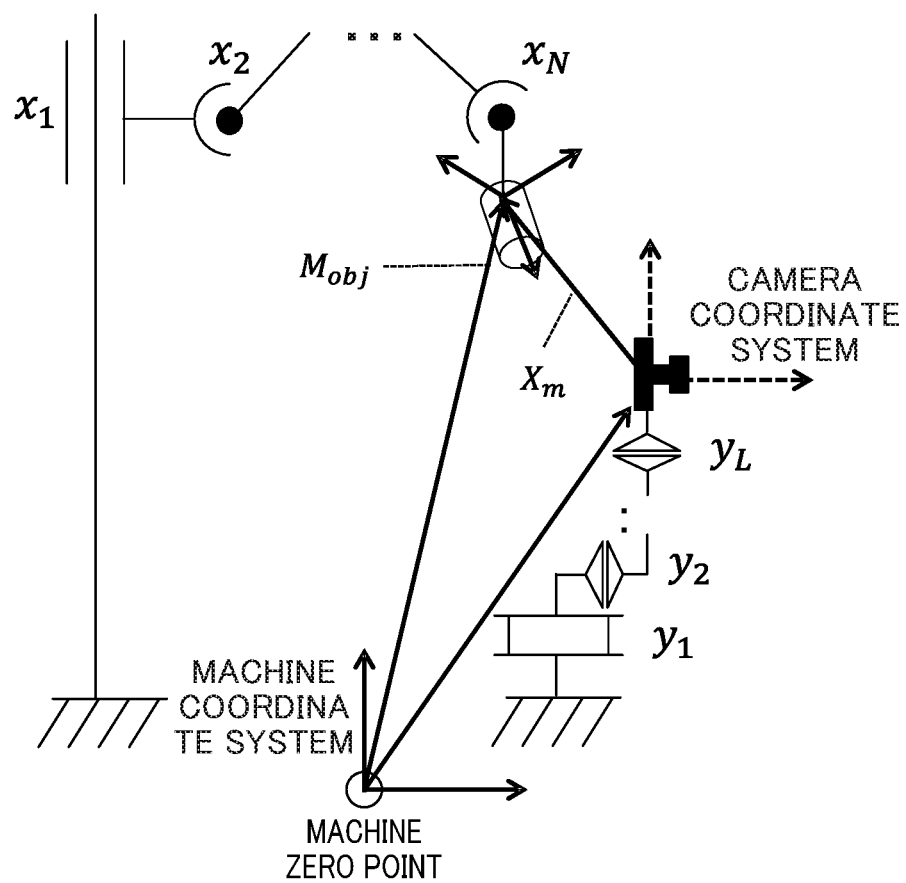
FIG. 19 is a diagram showing an example of the information used when the transformation information is generated in the embodiment of the present invention.

Here, as shown in FIG. 19, the homogeneous matrix $M_{obj}$ indicating the current position and posture of the virtual object on the control point with respect to the route (machine zero point) is determined by a formula below.

$$M_{obj}=(\Pi_{i=1}^{N}S_{x_i})M_{ctrl} \text{ where } \Pi_{i=1}^{N}S_{x_i}=S_{x_1}S_{x_2}\cdots S_{x_N} \quad \text{[Formula 3]}$$

Here, the meanings of symbols are as follows:

$S_{xi}$: homogeneous transformation matrix by individual nodes;

N: number of a series of nodes leading from the route of the machine configuration tree to the control point; and $M_{ctrl}$: homogeneous matrix of relative offset/posture for the parent node of the control point which is defined according to [Formula 2] described above from an offset vector/posture matrix defined in the control point.

The homogeneous transformation matrix $S_{xi}$ is varied depending on the type of node, and for example, in the case of a linear axis, the homogeneous transformation matrix is represented as follows.

$$S_{x_i} = \begin{pmatrix} 1 & 0 & 0 & \\ 0 & 1 & 0 & \overrightarrow{ofs}_{x_i} \\ 0 & 0 & 1 & \\ 0 & 0 & 0 & 1 \end{pmatrix} \begin{pmatrix} 1 & 0 & 0 & \\ 0 & 1 & 0 & x_i\overrightarrow{v}_{x_i} \\ 0 & 0 & 1 & \\ 0 & 0 & 0 & 1 \end{pmatrix} \quad \text{[Formula 4]}$$

Here, the meanings of symbols are as follows:

$x_i$: coordinate value of a node $x_i$;

$ofs_{xi}$: relative offset vector for the parent node of the node $x_i$; and $v_{xi}$: movement direction vector of the node $x_i$.

In the case of a rotary axis, the homogeneous transformation matrix is represented as follows.

$$S_{x_i} = \begin{pmatrix} 1 & 0 & 0 & \\ 0 & 1 & 0 & \overrightarrow{ofs}_{x_i} \\ 0 & 0 & 1 & \\ 0 & 0 & 0 & 1 \end{pmatrix} R(x_i, v_1, v_2, v_3) \quad \text{[Formula 5]}$$

-continued $$R(x_i, v_1, v_2, v_3) = \begin{pmatrix} v_1^2(1-\cos x_i) + \cos x_i & v_1 v_2(1-\cos x_i) - v_3 \sin x_i & v_1 v_3(1-\cos x_i) + v_2 \sin x_i & 0 \\ v_1 v_2(1-\cos x_i) + v_3 \sin x_i & v_2^2(1-\cos x_i) + \cos x_i & v_3 v_2(1-\cos x_i) - v_1 \sin x_i & 0 \\ v_1 v_3(1-\cos x_i) - v_2 \sin x_i & v_2 v_3(1-\cos x_i) + v_1 \sin x_i & v_3^2(1-\cos x_i) + \cos x_i & 0 \\ 0 & 0 & 0 & 1 \end{pmatrix}$$

Here, the meanings of symbols are as follows;
$v_1$: first component of the rotary axis direction vector of the node $x_i$;
$v_2$: second component of the rotary axis direction vector of the node $x_i$; and
$v_3$: third component of the rotary axis direction vector of the node $x_i$.

Here, a homogeneous matrix $X_m$ representing the current position and posture of the virtual object on the control point on the camera coordinate system is determined by a formula below using $M_{obj}$.

$$X_m = M_{coord}^{-1}(\Pi_{i=L}^1 S_{x_i}^{-1}) M_{obj} \quad \text{where} \quad \Pi_{i=L}^1 S_{x_i}^{-1} = S_{x_L}^{-1} S_{x_{L-1}}^{-1} \ldots S_{x_1}^{-1}$$
[Formula 6]

Here, the meanings of symbols are as follows;
L: number of a series of nodes leading from the route of the machine configuration tree to the coordinate system; and
$M_{coord}$: homogeneous matrix of relative offset/posture for the parent node of the camera which is defined according to the mathematical formula of [Formula 2] described above from an offset vector/posture matrix defined in the coordinate system

8. Method of Displaying Virtual Object

Figure 20:
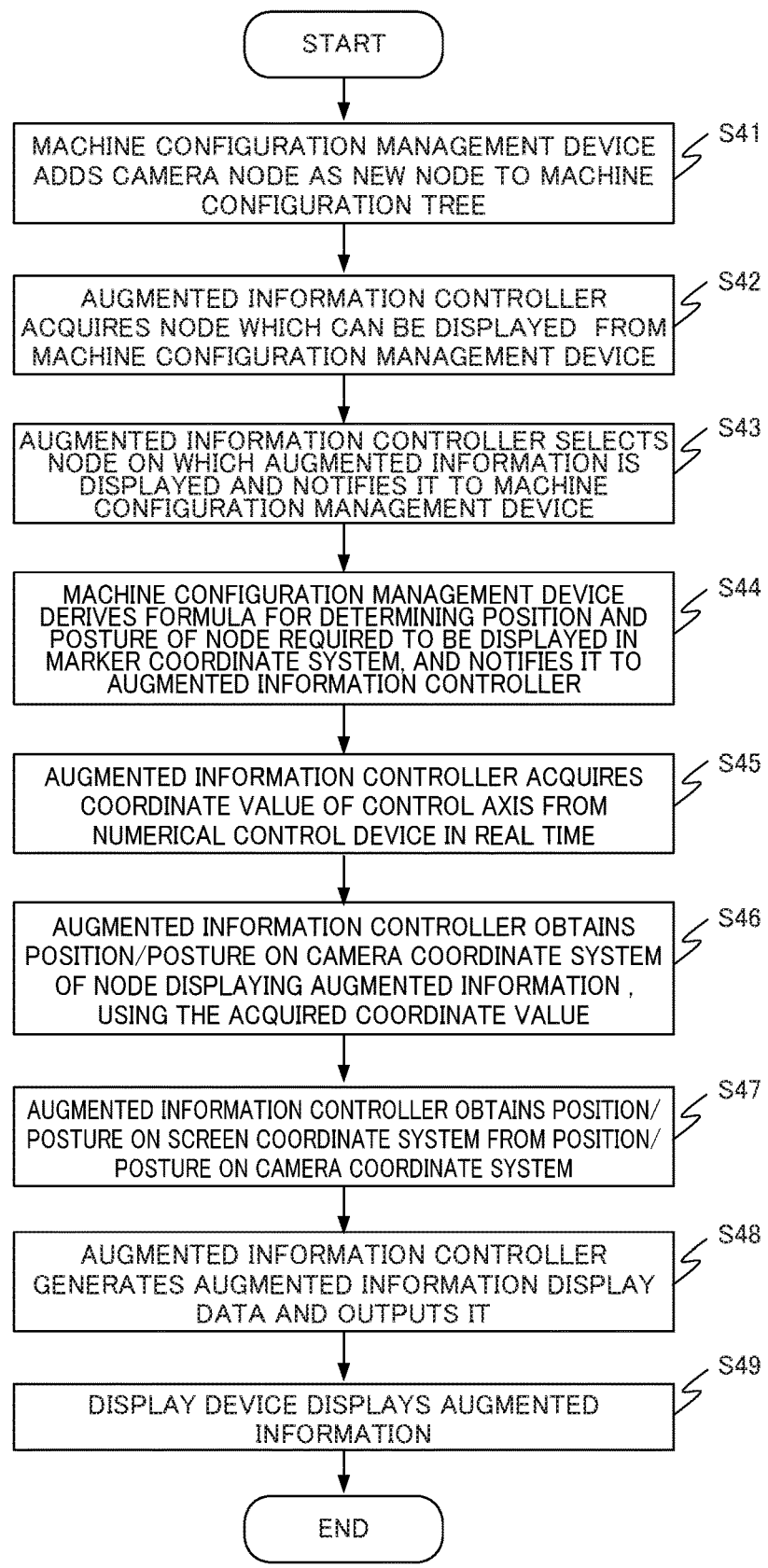
FIG. 20 is a diagram showing an operation flow of a method of displaying a virtual object in the embodiment of the present invention.

FIG. 20 shows an operation flow when a virtual object is displayed. First, individual steps will be schematically described.

Figure 21A:
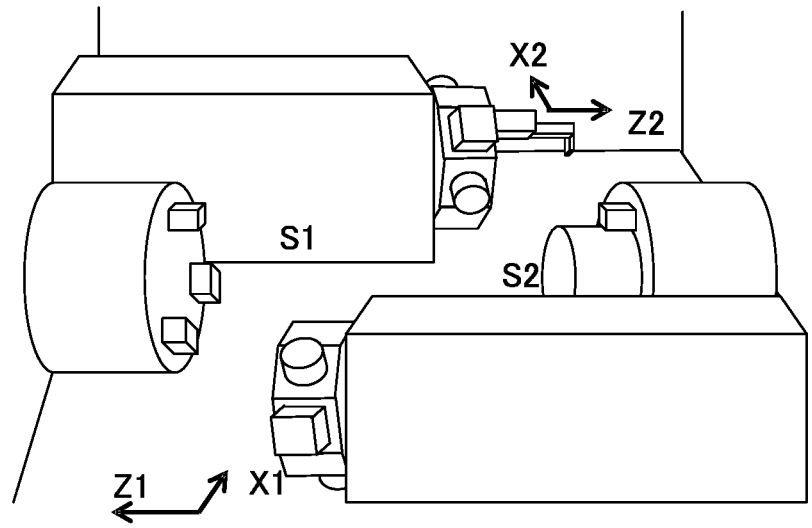
FIG. 21A is a diagram showing an example of the embodiment of the present invention.
Figure 21B:
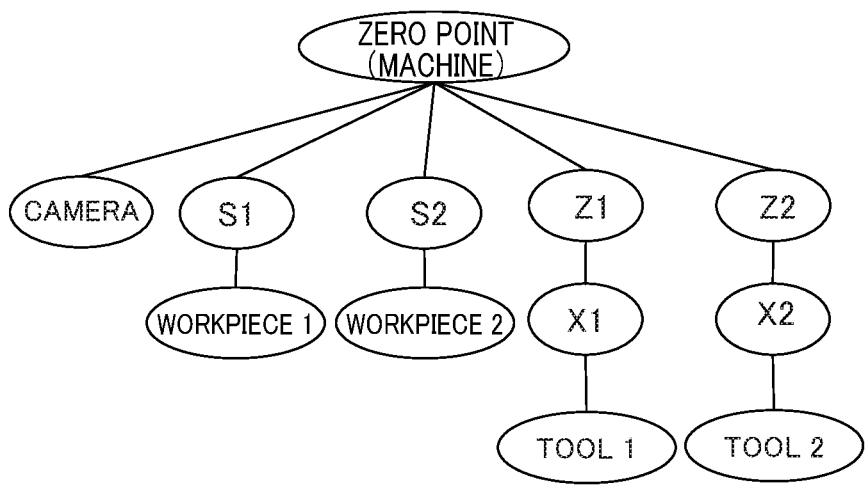
FIG. 21B is a diagram showing the example of the embodiment of the present invention.

In step S41, the machine configuration management device 100 adds a camera node to the machine configuration tree as a new node. In this way, for example, when the configuration of the machine tool 400 is a configuration as shown in FIG. 21A, the camera node is added to the machine configuration tree showing the configuration of the machine tool 400 as shown in FIG. 21B.

In step S42, the augmented information controller 200 acquires, from the machine configuration management device 100, a node which can be displayed.

In step S43, the augmented information controller 200 selects a node on which the augmented information of the virtual object and the like is displayed, and notifies it to the machine configuration management device 100.

In step S44, the machine configuration management device 100 derives a formula for determining the position and the posture of the node required to be displayed in the camera coordinate system, and notifies it to the augmented information controller 200.

In step S45, the augmented information controller 200 acquires the coordinate values of the individual control axes from the numerical controller 150.

In step S46, the augmented information controller 200 uses the acquired coordinate values and the formula for determining the position and the posture in the camera coordinate system so as to determine the position and the posture of the node on which the augmented information of the virtual object and the like is displayed in the camera coordinate system.

In step S47, the augmented information controller 200 determines the position and the posture in the screen coordinate system by the transformation of the coordinate system from the position and the posture in the camera coordinate system.

In step S48, the augmented information controller 200 generates augmented information display data which is the display data of the augmented information of the virtual object and the like, and outputs it to the display device 300.

In step S49, the display device 300 displays the augmented information of the virtual object and the like. Thereafter, the processing is returned to step S45.

The position and the posture of the node on which the augmented information of the virtual object and the like is displayed in the camera coordinate system may be determined in the machine configuration management device 100, and values indicating the position and the posture themselves may be notified to the augmented information controller 200.

In steps S47 described above, the augmented information controller 200 uses a known method so as to determine the position and the posture in the screen coordinate system from the position and the posture in the camera coordinate system.

More specifically, processing for determining the transformation information from the camera coordinate system into the screen coordinate system is performed, and by the transformation information, the position and the posture of the virtual object are transformed from the camera coordinate system into values in the screen coordinate system. The augmented information display data includes, in addition to the positions and the postures in the camera coordinate system and the screen coordinate system determined here, the data of the shape and the like of the virtual object. The augmented information display data is output to the display device 300, the output data is used and thus the display device 300 can draw the virtual object in appropriate positions of left and right screens.

Figure 22A:
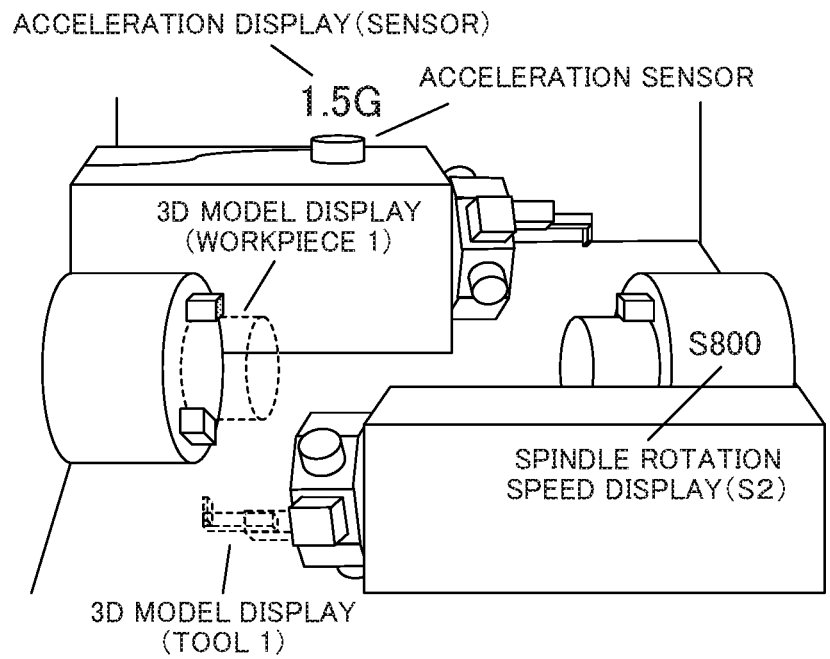
FIG. 22A is a diagram showing the example of the embodiment of the present invention.
Figure 22B:
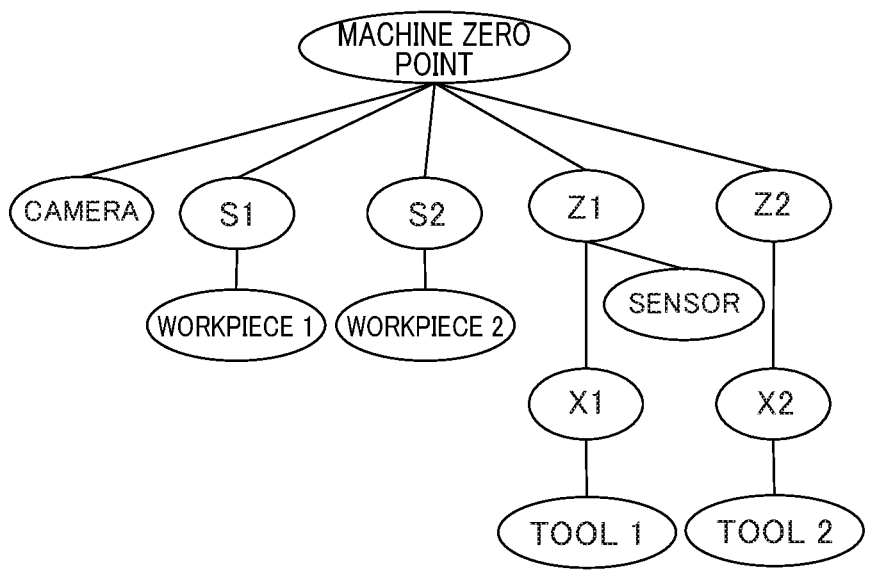
FIG. 22B is a diagram showing the example of the embodiment of the present invention.

By way of the above-mentioned method, it is possible to display the virtual object at an arbitrary node on the display. As shown in FIG. 22A, as the virtual objects, for example, 3D models for a workpiece and a tool may be arranged so as to be used for performing a machining simulation. Data which is associated with a node such as the number of revolutions of each spindle may be displayed. Furthermore, an acceleration sensor and a temperature sensor are arranged, and as shown in FIG. 22B, sensor nodes are added to the machine configuration tree, with the result that it is possible to visually check the acceleration and the temperature of each place. In this way, an operator of the machine tool 400 can check the data associated with the nodes and the numerical values of the sensors.

9. Effects Exerted by the Present Embodiment

In the present embodiment, the virtual objects can be arranged on all the nodes registered on the graph. In particular, by the addition of a camera node, it is possible to add a virtual object in an arbitrary position, and it is not necessary to additionally register the transformation formula for the amount of movement and to additionally recognize a singular point. It is also not necessary to recognize the initial position.

10. Modified Examples

Although partially repeated, the graph data may be stored in the machine configuration management device 100 but there is no limitation to this configuration. For example, the graph data may be stored in the augmented information controller 200 or may be stored on a server which is connected to the virtual object display system 10 through a network. The data of the machine configuration tree can be stored in the augmented information controller 200 or on the server, and thus the present invention can be applied to even an old machine tool. In this case, the above-described processing until step S43 is not performed, and step S44 is performed on the side of the augmented information controller 200.

The machine configuration management device 100 may be incorporated so as to be integrated into the numerical controller 150. The machine configuration management device 100 may also be present on a cloud.

The machine configuration management device, the numerical controller, the augmented information controller and the machine tool each can be realized by hardware, software or a combination thereof. The simulation method performed by the cooperation of the machine configuration management device, the numerical controller, the augmented information controller and the machine tool can also be realized by hardware, software or a combination thereof. Here, the realization by software means that the realization is achieved by reading and performing programs with a computer.

The programs are stored with various types of non-transitory computer readable media, and can be supplied to a computer. The non-transitory computer readable media include various types of tangible storage media. Examples of the non-transitory computer readable medium include magnetic storage media (for example, a flexible disk, a magnetic tape and a hard disk drive), magneto-optical storage media (for example, a magneto-optical disk), a CD-ROM (Read Only Memory), a CD-R, a CD-R/W, semiconductor memories (for example, a mask ROM and a PROM (Programmable ROM), an EPROM (Erasable PROM), a flash ROM and a RAM (random access memory). The programs may be supplied with various types of transitory computer readable media to a computer. Examples of the transitory computer readable medium include an electrical signal, an optical signal and electromagnetic waves. The transitory computer readable medium can supply the programs to a computer through a wired communication path such as an electrical wire or an optical wire or a wireless communication path.

EXPLANATION OF REFERENCE NUMERALS

10 virtual object display system
100 machine configuration management device
110 control portion
111 graph generation portion
112 node addition portion
113 control point coordinate system insertion portion
114 node information notification portion
115 transformation information calculation portion
116 transformation information notification portion
120 storage portion
150 numerical controller
160 control portion
161 coordinate information notification portion
162 servomotor control portion
200 augmented information controller
211 node selection portion
212 selection node notification portion
213 coordinate information transformation portion
214 augmented information display data calculation portion
215 augmented information display data notification portion
220 storage portion
300 display device
400 machine tool

What is claimed is:

1. A virtual object display system which comprises a machine configuration management device and an augmented information controller, in which the machine configuration management device includes a first memory; and a first processor, wherein the first processor executes a program stored in the first memory to perform first operations, and in which the augmented information controller includes a second memory; and a second processor, wherein the second processor executes a program stored in the second memory to perform second operations, and the first operations and the second operations comprising:

generating, as a machine configuration of a control target, a graph in which constituent elements including a camera are nodes as one of the first operations, the control target being a real machine tool, inserting a control point and a coordinate system into the graph as one of the first operations, notifying information of a node which can be displayed to the augmented information controller as one of the first operations, selecting a node on which a virtual object is desired to be displayed as one of the second operations, notifying the node on which the virtual object is desired to be displayed to the machine configuration management device as one of the second operations, calculating transformation information which includes, as a variable, a coordinate value of a control axis node on a path in the graph from a camera node to a node of a display target and which is used for calculating a position and/or a posture of the node of the display target in a coordinate system of the camera node based on the graph as one of the first operations, notifying the transformation information to the augmented information controller as one of the first operations and using the transformation information so as to transform the coordinate value of a control axis which is notified into the position and/or the posture of the node of the display target in the coordinate system of the camera node as one of the second operations, wherein the graph that is generated as the machine configuration of the control target has a form of a hierarchical tree structure in which the nodes are arranged with respect to a machine zero point in the coordinate system, each of the nodes containing information related to the camera, a control axis of the machine tool, a workpiece or a tool, wherein the transformation information includes a formula for determining the position and/or the posture of the node on which the virtual object is desired to be displayed in the coordinate system, or a value for determining the position and/or the posture of the node on which the virtual object is desired to be displayed in the coordinate system, and wherein the transformation information is calculated for each coordinate system of the camera node.

2. The virtual object display system according to claim 1, further comprising a display device, wherein the second operations further include: calculating, based on the position and/or the posture of the node of the display target in the coordinate system of the camera node, augmented information display data for calculating, with the display device, the virtual object as augmented information; and notifying the augmented information display data to the display device.

3. The virtual object display system according to claim 1, wherein the second operations include transforming, as the coordinate value of the control axis, a coordinate value received from a numerical controller into the position and/or the posture of the node of the display target in the coordinate system of the camera node.

4. The virtual object display system according to claim 1, wherein the augmented information controller further includes a storage portion having data of the graph.

5. The virtual object display system according to claim 1, further comprising a server which stores data of the graph.

6. The virtual object display system according to claim 1, wherein the machine configuration management device is integrated with a numerical controller of a machine tool.

7. The virtual object display system according to claim 1, wherein the machine configuration management device is present on a cloud.

8. The virtual object display system according to claim 1, wherein the control point and the coordinate system are defined in all nodes of the tree-structure graph.

9. The virtual object display system according to claim 1, wherein generating the graph includes:

arranging a zero point and a plurality of nodes, each of nodes corresponds to a plurality of axis of the machine tool, the tool, and the workpiece, setting axis names of individual axes, names of individual tools, names of individual workpieces, names of individual zero points and physical axis numbers of the individual axes, setting parent nodes of the individual axes, parent nodes of the individual tools and parent nodes of the individual workpieces, and setting cross-offsets of the individual axes, cross-offsets of the individual tools and cross-offsets of the individual workpieces.

10. The virtual object display system according to claim 1, wherein generating the graph includes:

receiving a value of a parameter to the node, if an item of the parameter is "parent node of itself",
    if a parent node has already been set to the node to which the parameter is set, deleting an identifier of itself from the item of "child node" possessed by the current parent node of the node to which the parameter is set so as to update a machine configuration tree,
    if the parent node has not been set to the node to which the parameter is set, setting a value to the corresponding item of the node to which the parameter is set, and
    adding the identifier of itself to the item of "child node" in the parent node so as to update the machine configuration tree, and if an item of the parameter is not "parent node of itself", setting the value to the corresponding item of the node to which the parameter is set.

11. The virtual object display system according to claim 1, wherein, each of the control points and the coordinate systems has an offset and a posture matrix, the posture matrix of the control point indicates a posture of the control point, the posture matrix of the coordinate system indicates a posture of the coordinate system, the offset and the posture matrix are represented so as to be associated with the nodes corresponding thereto, each of the control points and the coordinate systems has information on whether or not the "move" and the "cross-offset" of the node present on a path up to a route of a machine configuration tree are individually added.

12. The virtual object display system according to claim 1, wherein inserting the control point and the coordinate system into the graph includes:

setting a machine configuration tree, when the control point and the coordinate system have not been inserted into the node, inserting the control point and the coordinate system into the node, and stacking a variable n by 1, when the nth child node is present in the node, performing a process in a recursive manner, and performing the increment such that n=n+1, and when the nth child node is not present in the node, popping the variable n by 1.

13. The virtual object display system according to claim 1, wherein individual nodes of the graph in the machine configuration have the control points and the coordinate systems as information.

14. The virtual object display system according to claim 1, wherein the offset, the type of node, the axis direction, the posture matrix and the coordinate value are given to the individual nodes, the type of node includes linear line, rotation, unit, control point and coordinate system, and a homogeneous matrix indicating the current position and posture of the virtual object on the control point with respect to the machine zero point is determined based on homogeneous transformation matrix by individual nodes, number of a series of nodes leading from the route of the machine configuration tree to the control point, and homogeneous matrix of relative offset/posture for the parent node of the control point.

* * * * *